US012726266B2

(12) United States Patent
Kim et al.

(10) Patent No.: US 12,726,266 B2
(45) Date of Patent: Sep. 1, 2026

(54) TECHNIQUE AND APPARATUS FOR MANAGING MOBILITY OF TERMINAL IN SATELLITE COMMUNICATION SYSTEM

(71) Applicant: Samsung Electronics Co., Ltd., Suwon-si (KR)

(72) Inventors: Sunhyun Kim, Suwon-si (KR); Jungsoo Jung, Suwon-si (KR); Seungil Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 18/245,664

(22) PCT Filed: Sep. 9, 2021

(86) PCT No.: PCT/KR2021/012293
§ 371 (c)(1),
(2) Date: Mar. 16, 2023

(87) PCT Pub. No.: WO2022/060008
PCT Pub. Date: Mar. 24, 2022

(65) Prior Publication Data

US 2023/0336241 A1 Oct. 19, 2023

(30) Foreign Application Priority Data

Sep. 18, 2020 (KR) ........................ 10-2020-0120311

(51) Int. Cl.
*H04B 7/185* (2006.01)
*H04W 68/02* (2009.01)

(52) U.S. Cl.
CPC ........ *H04B 7/18558* (2013.01); *H04W 68/02* (2013.01)

(58) Field of Classification Search
CPC ............ H04B 7/18558; H04B 7/18539; H04B 7/2041; H04B 7/1853; H04B 7/1851; H04B 7/18545; H04W 68/02; Y02D 30/70
See application file for complete search history.

(56) References Cited

U.S. PATENT DOCUMENTS 5,161,248 A 11/1992 Bertiger et al.
5,483,664 A 1/1996 Moritz et al.
(Continued)

FOREIGN PATENT DOCUMENTS

CN 110636609 A 12/2019
CN 110972257 A 4/2020
(Continued)

OTHER PUBLICATIONS

Examination Results dated Dec. 24, 2024, in connection with Korean Application No. 10-2020-0120311, 2 pages.
(Continued)

*Primary Examiner* — Ayaz R Sheikh
*Assistant Examiner* — Tarell A Hampton

(57) ABSTRACT

The present disclosure relates to a $5^{th}$ generation (5G) or $6^{th}$ generation (6G) communication system for supporting a data rate higher than a $4^{th}$ generation (4G) communication system such as long term evolution (LTE). The present disclosure provides a satellite communication cell management apparatus for managing satellite communication cells of at least one satellite, the satellite communication cell management apparatus including a transceiver, and at least one processor, wherein the at least one processor is configured to connect the satellite communication cells to base stations (BSs), and update connections between the satellite
(Continued)

communication cells and the BSs, according to a relative movement of the at least one satellite with respect to the ground.

9 Claims, 27 Drawing Sheets

(56) References Cited

U.S. PATENT DOCUMENTS

| | | | | |
|---|---|---|---|---|
| 5,649,291 | A | 7/1997 | Tayloe | |
| 5,924,042 | A * | 7/1999 | Sakamoto | H04W 68/06 455/445 |
| 8,131,293 | B2 | 3/2012 | Dutta | |
| 8,862,160 | B2 | 10/2014 | Laroia et al. | |
| 8,989,744 | B2 | 3/2015 | Wang et al. | |
| 10,070,412 | B1 | 9/2018 | Liu et al. | |
| 10,375,564 | B2 | 8/2019 | Ryu et al. | |
| 11,616,567 | B2 | 3/2023 | Lin et al. | |
| 11,917,577 | B2 | 2/2024 | Sun | |
| 2001/0004595 | A1* | 6/2001 | Dent | H04W 68/08 455/435.2 |
| 2010/0002660 | A1* | 1/2010 | Grayson | H04W 4/20 370/338 |
| 2020/0052782 | A1 | 2/2020 | Wang et al. | |
| 2020/0077358 | A1* | 3/2020 | Kovacs | H04W 4/022 |
| 2020/0196263 | A1 | 6/2020 | Heyn et al. | |
| 2020/0213000 | A1 | 7/2020 | Arur et al. | |
| 2021/0203409 | A1* | 7/2021 | Regunathan | H04B 7/18539 |
| 2021/0218467 | A1 | 7/2021 | Jin et al. | |
| 2021/0235416 | A1* | 7/2021 | Dou | H04W 16/28 |
| 2022/0007267 | A1* | 1/2022 | Maattanen | H04W 8/26 |
| 2022/0007328 | A1* | 1/2022 | Sun | H04B 7/18558 |
| 2022/0216912 | A1* | 7/2022 | Hu | H04B 7/1853 |

FOREIGN PATENT DOCUMENTS

| | | | |
|---|---|---|---|
| CN | 111095820 | A | 5/2020 |
| CN | 111629400 | A | 9/2020 |
| EP | 02426960 | B1 | 2/2014 |
| JP | H07-075156 | A | 3/1995 |
| KR | 10-0395381 | B1 | 11/2003 |
| KR | 10-1049422 | B1 | 7/2011 |
| KR | 10-1054547 | B1 | 8/2011 |
| WO | 2020034316 | A1 | 2/2020 |
| WO | 2020043349 | A1 | 3/2020 |
| WO | 2020064651 | A1 | 4/2020 |
| WO | 2020091647 | A1 | 5/2020 |
| WO | 2020092561 | A1 | 5/2020 |
| WO | 2020098632 | A1 | 5/2020 |

OTHER PUBLICATIONS

Supplementary European Search Report dated Feb. 9, 2024, in connection with European Application No. 21869630.0, 10 pages.
LG Electronics Inc, "Discussion on the Issue for paging in NT," R2-1816447, 3GPP TSG-RAN WG2 #104, Spokane, USA, Nov. 12-16, 2018, 5 pages.
ZTE, "Discussion on Tracking Area Management in NT," R2-1814243, 3GPP TSG-RAN WG2 #103bis, Chengdu, China, Oct. 8-12, 2018, 6 pages.
International Search Report and Written Opinion of the International Searching Authority dated Dec. 16, 2021, in connection with International Application No. PCT/KR2021/012293, 13 pages.
Notification of the First Office Action dated Jul. 29, 2025, in connection with Chinese Application No. 202180063761.X, 21 pages.
Notification of the Second Office Action dated Jan. 28, 2026, in connection with Chinese Patent Application No. 202180063761.X, 14 pages.
Office Action dated Jun. 8, 2026, in connection with Chinese Application No. 202180063761.X, 16 pages.
Office Action dated Jun. 10, 2026, in connection with Indian Application No. 202337027892, 7 pages.

* cited by examiner

Satellite movement direction
410
SV1
400
420
SV2
430
SV3
450
440
SV4
DU1
DU2
DU3
DU4
DU5
DU6
DU7
DU8
DU9
DU10
DU11
DU12
DU13
DU14
DU15
DU16
420
SV2
400
530
SV3
440
SV4
450
SV5
DU5
DU6
DU7
DU8
DU1
DU2
DU3
DU4
DU13
DU14
DU15
DU16
DU9
DU10
DU11
DU12

FIG. 6

Satellite movement direction

FIG. 9

920
MMS
910
MC
930
940
SV1
950
SV2
1st paging
906
Cell1
901
Cell2
903
Cell3
905
Cell4
907
DU1
DU2
DU3
DU4
RA

FIG. 12

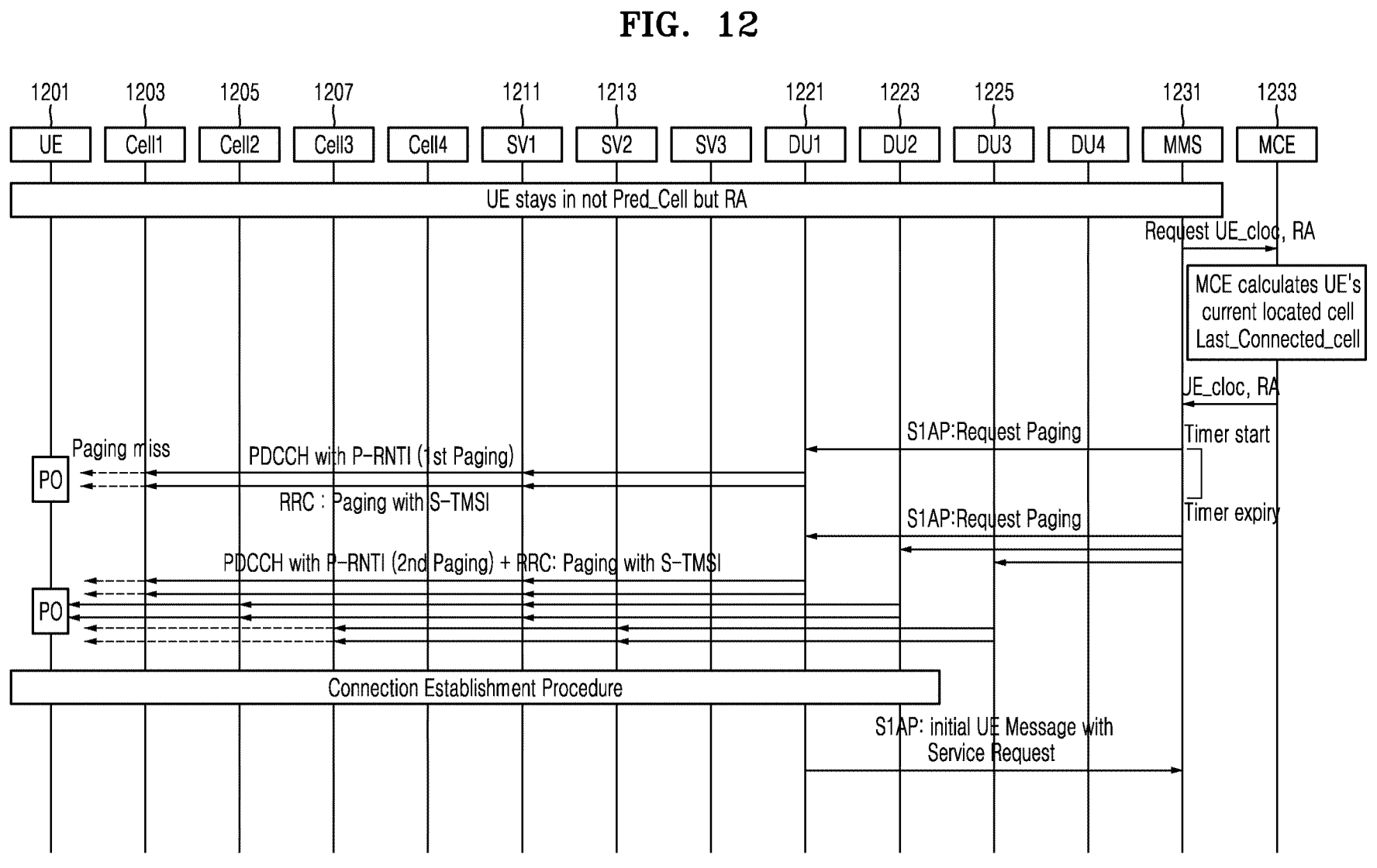

1201 UE
1203 Cell1
1205 Cell2
1207 Cell3
Cell4
1211 SV1
1213 SV2
SV3
1221 DU1
1223 DU2
1225 DU3
DU4
1231 MMS
1233 MCE UE stays in not Pred_Cell but RA
Request UE_cloc, RA
MCE calculates UE's current located cell Last_Connected_cell
UE_cloc, RA
Timer start
Timer expiry
S1AP:Request Paging
PDCCH with P-RNTI (1st Paging)
RRC : Paging with S-TMSI
Paging miss
PO
S1AP:Request Paging
PDCCH with P-RNTI (2nd Paging) + RRC: Paging with S-TMSI
PO
Connection Establishment Procedure
S1AP: initial UE Message with Service Request

FIG. 13

MMS
MC
SV1
SV2
3rd paging
Cell1
Cell2
Cell3
Cell4
DU1
DU2
DU3
DU4
RA

FIG. 18

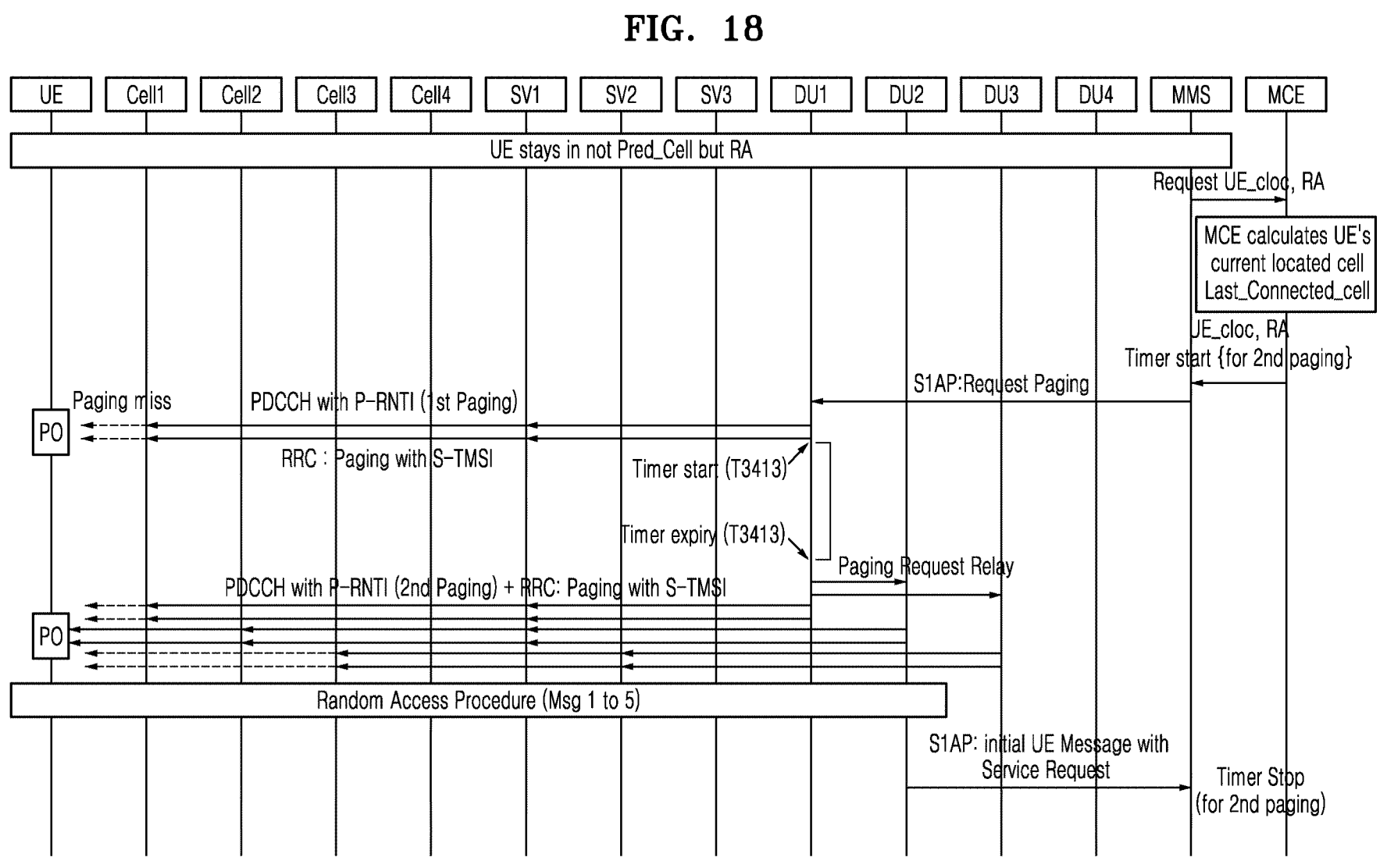

UE
Cell1
Cell2
Cell3
Cell4
SV1
SV2
SV3
DU1
DU2
DU3
DU4
MMS
MCE

UE stays in not Pred_Cell but RA

Request UE_cloc, RA

MCE calculates UE's current located cell Last_Connected_cell

UE_cloc, RA

Timer start {for 2nd paging}

S1AP:Request Paging

PDCCH with P-RNTI (1st Paging)

RRC : Paging with S-TMSI

Timer start (T3413)

Timer expiry (T3413)

Paging miss

PO

Paging Request Relay

PDCCH with P-RNTI (2nd Paging) + RRC: Paging with S-TMSI

PO

Random Access Procedure (Msg 1 to 5)

S1AP: initial UE Message with Service Request

Timer Stop (for 2nd paging)

FIG. 19
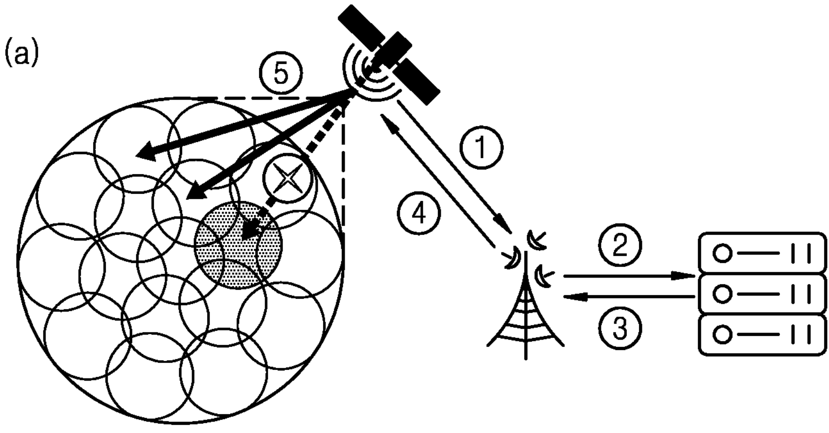
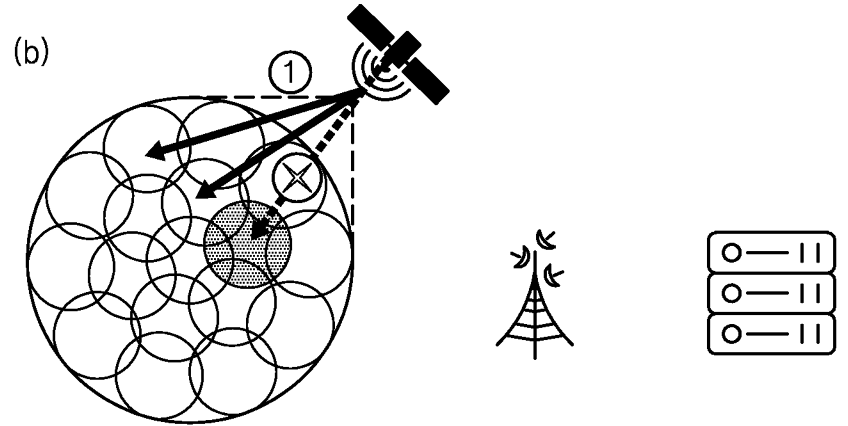

TECHNIQUE AND APPARATUS FOR MANAGING MOBILITY OF TERMINAL IN SATELLITE COMMUNICATION SYSTEM

CROSS-REFERENCE TO RELATED APPLICATIONS

This application is a 371 National Stage of International Application No. PCT/KR2021/012293, filed Sep. 9, 2021, which claims priority to Korean Patent Application No. 10-2020-0120311, filed Sep. 18, 2020, the disclosures of which are herein incorporated by reference in their entirety.

BACKGROUND

1. Field

Embodiments of the present disclosure relate to an apparatus and method for managing mobility of a user equipment (UE) in a satellite communication system.

2. Description of Related Art

Considering the development of wireless communication from generation to generation, the technologies have been developed mainly for services targeting humans, such as voice calls, multimedia services, data services, and the like. Following the commercialization of 5th generation (5G) communication systems, it is expected that connected devices being exponentially growing will be connected to communication networks. Examples of things connected to networks may include vehicles, robots, drones, home appliances, displays, smart sensors connected to various infrastructures, construction machines, factory equipment, and the like. Mobile devices are expected to evolve in various form-factors such as augmented reality glasses, virtual reality headsets, hologram devices, and the like. In order to provide various services by connecting hundreds of billions of devices and things in the 6th generation (6G) era, there have been ongoing efforts to develop enhanced 6G communication systems. For these reasons, 6G communication systems are referred to as beyond-5G systems.

6G communication systems, which are expected to be commercialized around 2030, will have a peak data rate of tera (i.e., 1,000 giga)-level bps and radio latency less than 100 pec. That is, the 6G communication systems will be 50 times as fast as 5G communication systems and have the 1/10 radio latency thereof.

In order to achieve such a high data rate and ultra-low latency, it has been considered to implement the 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance, that is, coverage, will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, in order to improve the coverage of terahertz-band signals, there has been ongoing discussion on new technologies such as metamaterial-based lenses and antennas, a high-dimensional spatial multiplexing technology using orbital angular momentum (OAM), reconfigurable intelligent surface (RIS), and the like.

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for using satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by using AI in a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will allow the next hyper-connected experience. In more detail, it is expected that services such as truly immersive extended reality (XR), high-fidelity mobile hologram, and digital replica could be provided through the 6G communication systems. In addition, services such as remote surgery for security and reliability enhancement, industrial automation, and emergency response will be provided through the 6G communication system, such that the technologies could be applied in various fields such as industry, medical care, automobiles, home appliances, and the like.

Accordingly, communication using satellites may be provided in some wireless communication systems. However, as a satellite corresponding to a user equipment (UE) is frequently changed due to movement of satellites in the communication using satellites, there is a need for a method of managing mobility of a UE.

SUMMARY

An embodiment of the present disclosure provides an apparatus and method for managing mobility of a user equipment (UE) in a satellite communication system, such that the UE and a base station (BS) may effectively transmit or receive signals to or from a satellite.

Embodiments of the present disclosure may provide a satellite communication cell management apparatus and an operating method thereof for managing mobility of a user equipment (UE) in a satellite communication system. According to an embodiment of the present disclosure, a satellite communication cell management apparatus for managing satellite communication cells of at least one satellite may include a transceiver, and at least one processor. The at least one processor of the satellite communication cell management apparatus may be configured to connect the satellite communication cells to base stations (BSs), and update connections between the satellite communication cells and the BSs, according to a relative movement of the at least one satellite with respect to the ground.

According to an embodiment of the present disclosure, the at least one processor may be configured to connect satellite communication cells in a management area of a first BS center to BSs managed by the first BS center, when a first satellite communication cell exits from the management area of the first BS center and a second satellite communication cell enters the management area of the first BS center, according to the relative movement of the at least one satellite with respect to the ground, release a connection between the first satellite communication cell and a first BS connected to the first satellite communication cell, and connect the second satellite communication cell to the first BS.

In an embodiment of the present disclosure, some of the satellite communication cells may constitute a registration area (RA), and the satellite communication cells constituting the RA may be disposed to be arranged in a band shape extending in the relative movement direction of the at least one satellite with respect to the ground.

In an embodiment of the present disclosure, the at least one processor may be configured to, when performing paging on a UE for which last-connected satellite communication cell is a first satellite communication cell, transmit a paging request message to a second satellite communication cell corresponding to a ground location of the UE when the UE was last-connected to the first satellite communication cell, based on the first satellite communication cell and the relative movement of the at least one satellite with respect to the ground.

In an embodiment of the present disclosure, the at least one processor may be configured to, when performing paging on a UE for which last-connected satellite communication cell is a first satellite communication cell, transmit a paging request message to a plurality of satellite communication cells as paging with respect to a second satellite communication cell fails, the second satellite communication cell corresponding to a ground location of the UE when the UE was last-connected to the first satellite communication cell, based on the first satellite communication cell and the relative movement of the at least one satellite with respect to the ground.

In an embodiment of the present disclosure, the plurality of satellite communication cells may include at least some of satellite communication cells constituting an RA and including the second satellite communication cell, at least some of satellite communication cells within satellite coverage of satellites providing at least a part of the RA, or at least some of satellite communication cells within satellite coverages of a plurality of satellites.

In an embodiment of the present disclosure, the at least one processor may be configured to, as paging with respect to the second satellite communication cell results in failure, attempt paging while gradually broadening a range of satellite communication cells until the paging succeeds.

In an embodiment of the present disclosure, the at least one processor may be configured to, when performing paging on a UE for which last-connected satellite communication cell is a first satellite communication cell, receive a paging response message from a third satellite communication cell after paging with respect to a second satellite communication cell fails, the second satellite communication cell corresponding to a ground location of the UE when the UE was last-connected to the first satellite communication cell, based on the first satellite communication cell and the relative movement of the at least one satellite with respect to the ground. Also, the paging response message may be a message that is transmitted as a result of succeeding in paging to the UE by transmitting, by a first satellite providing the second satellite communication cell, a paging relay message to a second satellite providing the third satellite communication cell.

Other embodiments of the present disclosure may provide a UE and an operating method thereof for managing mobility of the UE in a satellite communication system. The UE may include a transceiver, and at least one processor, wherein the at least one processor is configured to receive a broadcasting signal from a plurality of BSs, determine, based on the broadcasting signal, whether the plurality of BSs are included in a satellite network or a ground network, determine, based on the broadcasting signal, whether the plurality of BSs are included in the satellite network or the ground network, according to determining that the plurality of BSs are included in the satellite network, receive a paging message from a satellite communication cell in which the UE is currently located, and perform a connection establishment procedure with a BS corresponding to the satellite communication cell.

In an embodiment of the present disclosure, a satellite communication cell to which the UE was last-connected may be a first satellite communication cell, a satellite communication cell corresponding to the BS performing the connection establishment procedure may be a second satellite communication cell, and the second satellite communication cell be a satellite communication cell corresponding to a ground location of the UE when the UE was last-connected to the first satellite communication cell.

In an embodiment of the present disclosure, a satellite communication cell to which the UE was last-connected may be a first satellite communication cell, a satellite communication cell corresponding to a ground location of the UE when the UE was last-connected to the first satellite communication cell may be a second satellite communication cell, a satellite communication cell corresponding to the BS performing the connection establishment procedure may be a third satellite communication cell, the UE may receive a paging message from the third satellite communication cell as the UE fails to receive a paging message from the second satellite communication cell, and the third satellite communication cell may be one among satellite communication cells constituting an RA and including the second satellite communication cell, satellite communication cells within satellite coverage of satellites providing at least a part of the RA, or satellite communication cells within satellite coverages of a plurality of satellites.

In an embodiment of the present disclosure, a satellite communication cell to which the UE was last-connected may be a first satellite communication cell, a satellite communication cell corresponding to a ground location of the UE when the UE was last-connected to the first satellite communication cell may be a second satellite communication cell, a satellite communication cell corresponding to the BS performing the connection establishment procedure may be a third satellite communication cell, and the third satellite communication cell may be a satellite communication cell in which a network entity succeeds in paging to the UE as a result of attempting the paging while gradually broadening a range of satellite communication cells until the paging succeeds as the UE fails to receive a paging message from the second satellite communication cell.

In an embodiment of the present disclosure, a satellite communication cell to which the UE was last-connected may be a first satellite communication cell, a satellite communication cell corresponding to a ground location of the UE when the UE was last-connected to the first satellite communication cell may be a second satellite communication cell, a satellite communication cell corresponding to the BS performing the connection establishment procedure may be a third satellite communication cell, and the third satellite communication cell may be a satellite communication cell that performs a paging procedure on the UE when a first satellite providing the second satellite communication cell transmits a paging relay message to a second satellite providing the third satellite communication cell as the UE fails to receive a paging message from the second satellite communication cell.

Other embodiments of the present disclosure may provide a BS and an operating method thereof for managing a satellite communication cell for managing mobility of a UE in a satellite communication system. The BS for managing a satellite communication cell may include a transceiver, and at least one processor, wherein the at least one processor is configured to perform a connection to a first satellite communication cell, when the first satellite communication cell exits from a management area of a BS center and a second satellite communication cell enters the management area of the BS center, according to a relative movement of at least one satellite with respect to the ground, release the connection to the first satellite communication cell, and establish a connection to the second satellite communication cell.

In an embodiment of the present disclosure, the satellite communication cell may be included in an RA, and satellite communication cells constituting the RA may be disposed to be arranged in a band shape extending in a relative movement direction of at least one satellite with respect to the ground.

In an embodiment of the present disclosure, the at least one processor is configured to, when performing paging on a UE for which last-connected satellite communication cell is a third satellite communication cell, receive a paging request message from the network entity, and based on the received paging message, transmit a paging message to the UE, as a result of determining, by the network entity, that the BS is a BS corresponding to a fourth satellite communication cell corresponding to a ground location of the UE when the UE was last-connected to the third satellite communication cell, based on the third satellite communication cell and the relative movement of at least one satellite with respect to the ground.

In an embodiment of the present disclosure, the at least one processor is configured to, when performing paging on a UE for which last-connected satellite communication cell is a third satellite communication cell, receive a paging request message from a network entity and transmit the paging message to the UE, as a result of paging with respect to a fourth satellite communication cell fails, the fourth satellite communication cell corresponding to a ground location of the UE when the UE was last-connected to the third satellite communication cell, based on the third satellite communication cell and the relative movement of at least one satellite with respect to the ground, and wherein the paging request message may include one of a paging message received from a core network and a paging relay message received from other BS.

Other embodiments of the present disclosure may provide a satellite and an operating method thereof for providing a plurality of satellite communication cells for managing mobility of a UE in a satellite communication system. The satellite for providing a plurality of satellite communication cells may include a transceiver, and at least one processor, wherein the at least one processor is configured to, when performing paging on a UE for which last-connected satellite communication cell is a first satellite communication cell, perform paging on the UE, based on a result of transmitting, by a network entity, a paging request message to a second satellite communication cell corresponding to a ground location of the UE when the UE was last-connected to the first satellite communication cell, based on the first satellite communication cell, and a relative movement of at least one satellite with respect to the ground.

In an embodiment of the present disclosure, some of the plurality of satellite communication cells may constitute an RA, and the satellite communication cells constituting the RA may be disposed to be arranged in a band shape extending in a relative movement direction of the satellite with respect to the ground.

In an embodiment of the present disclosure, the at least one processor may be configured to receive a paging relay message from a first satellite failed paging to the UE, and, based on the received paging relay message, perform paging on the UE, and the first satellite may provide a second satellite communication cell that corresponds to a ground location of the UE when the UE was last-connected to the first satellite communication cell, based on the first satellite communication cell and a relative movement of at least one satellite with respect to the ground.

BRIEF DESCRIPTION OF THE DRAWINGS

FIG. 6 illustrates a movement of an RA according to a movement of a satellite communication cell according to an embodiment of the present disclosure.

FIG. 9 illustrates a method of managing mobility of a UE by tracking a ground location of the UE according to an embodiment of the present disclosure.

FIG. 12 illustrates a method of managing mobility of a UE in an RA by tracking a ground location of the UE according to an embodiment of the present disclosure.

FIG. 13 illustrates a method of managing mobility of a UE in coverage of a satellite by tracking a ground location of the UE according to an embodiment of the present disclosure.

FIG. 18 illustrates a flowchart of a method of managing mobility of a UE via communication between satellites according to an embodiment of the present disclosure.

FIG. 19A illustrates a method of managing mobility of a UE via communication with a core network or communication between satellites according to an embodiment of the present disclosure.

FIG. 19B illustrates a method of managing mobility of a UE via communication with a core network or communication between satellites according to an embodiment of the present disclosure.

DETAILED DESCRIPTION

Figure 1:
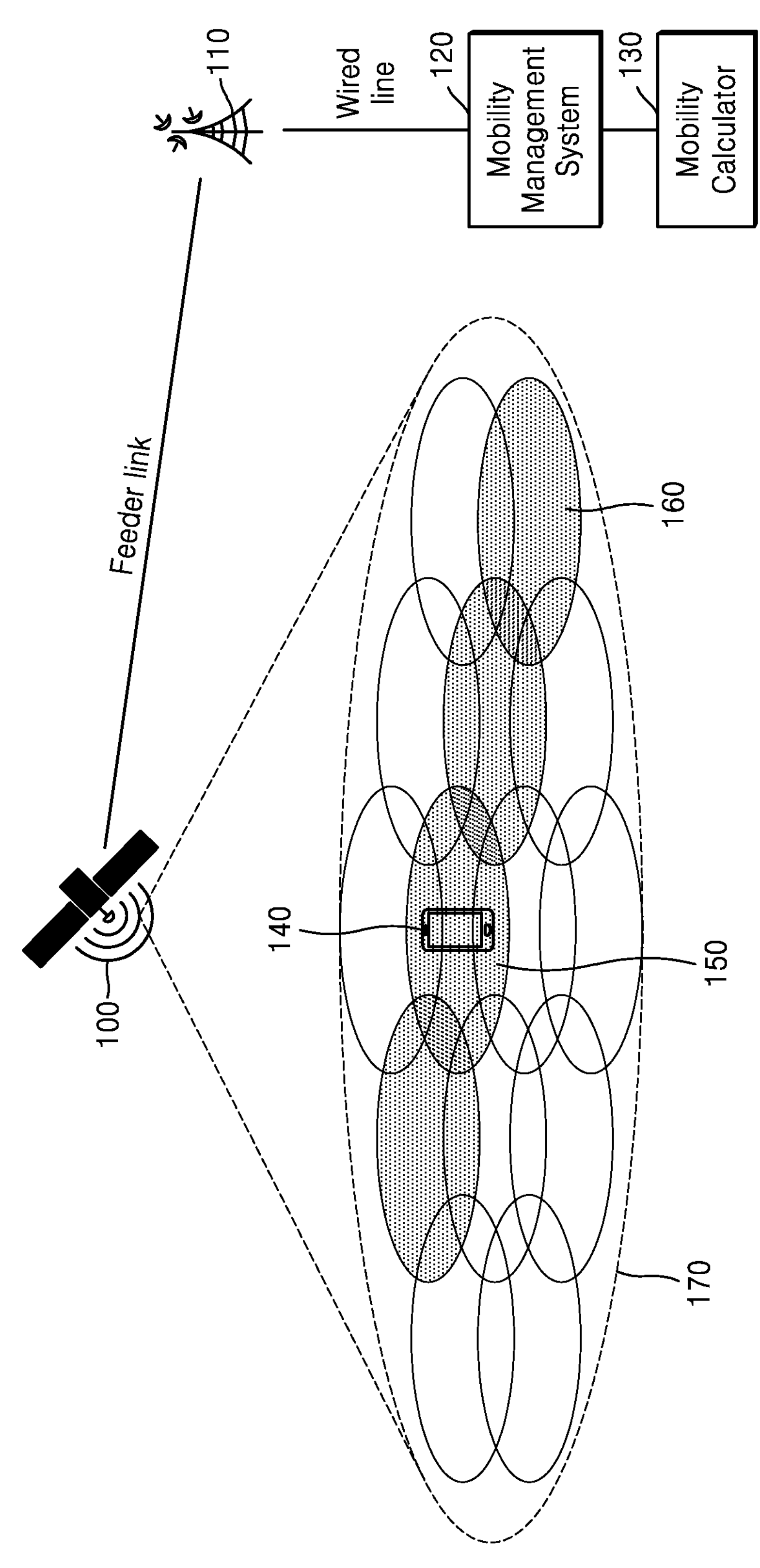
FIG. 1 illustrates a method of managing mobility of a user equipment (UE) according to an embodiment of the present disclosure.

Hereinafter, operational principles of the present disclosure will be described in detail with reference to accompanying drawings. In the description of the present disclosure, detailed descriptions of the related art are omitted when it is deemed that they may unnecessarily obscure the essence of the present disclosure. The terms used in the specification are defined in consideration of functions used in the present disclosure, and can be changed according to the intent or commonly used methods of users or operators. Accordingly, definitions of the terms are understood based on the entire description of the present specification. Hereinafter, terms identifying an access node, terms indicating network entities, terms indicating messages, terms indicating an interface between network entities, and terms indicating various pieces of identification information, as used in the following descriptions, are exemplified for convenience of description. Therefore, the present disclosure is not limited to terms to be described below, and other terms indicating objects having equal technical meanings may be used.

The advantages and features of the present disclosure and methods of achieving them will become apparent with reference to embodiments of the present disclosure described in detail below with reference to the accompanying drawings. The present disclosure may, however, be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to an embodiment, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, according to an embodiment, a " . . . unit" may include one or more processors.

In the description of the present disclosure, detailed descriptions of the related art are omitted when it is deemed that they may unnecessarily obscure the essence of the present disclosure. Hereinafter, embodiments of the present disclosure will be described in detail with reference to accompanying drawings.

In the description below, a physical channel and a signal may be interchangeably used with data or a control signal. For example, while a physical downlink shared channel (PDSCH) is the term indicating a physical channel on which data is transmitted, the PDSCH may also be used to refer to data. That is, in the present disclosure, the expression "transmit a physical channel" may be equally interpreted as the expression "transmit data or a signal on a physical channel".

Hereinafter, in the present disclosure, higher layer signaling may refer to a method of transferring a signal to a user equipment from a base station on a downlink (DL) data channel of a physical layer or to the base station from the user equipment on an uplink (UL) data channel of the physical layer. The higher layer signaling may be understood as radio resource control (RRC) signaling or a media access control (MAC) control element (CE).

Hereinafter, for convenience of descriptions, terms and names defined in the 3rd Generation Partnership Project Long Term Evolution (3GPP LTE) standard are used. However, the present disclosure is not limited to these terms and names, and may be equally applied to systems conforming to other standards. In the present disclosure, an evolved node B (eNB) may be interchangeably used with a next-generation node B (gNB) for convenience of descriptions. That is, a base station described by an eNB may represent a gNB. In the present disclosure, the term "terminals" may refer to not only mobile phones, narrowband Internet of Things (NB-IoT) devices, and sensors but also other wireless communication devices.

Hereinafter, a registration area (RA) refers to a logical concept of an area in which a UE can move without changing UE location information of a mobility management entity such as a mobility management entity (MME) or an access and mobility management function (AMF) or a core network, and refers to an area for managing a plurality of B Ss by grouping them so as to approximatively detect a location of a UE when the UE is in an idle state. In an embodiment, the RA may correspond to a tracking area (TA) in the LTE system or a registration area (RA) in the NR system. Also, a network may allocate one or more RA lists or TA lists to a UE.

Hereinafter, an entity for managing mobility may be an MME in the LTE system and an AMF in the NR system, but the present disclosure is not limited thereto, and may be an entity for managing UE mobility in the beyond 5G system. Also, an entity for calculating mobility may be an MME in the LTE system and an AMF or a network data analytics function (NWDAF) in the NR system, but the present disclosure is not limited thereto, and may be an entity for managing mobility in the beyond 5G system. In an embodiment, the entity for managing mobility and the entity for calculating mobility may each be present as a function or an external module.

Hereinafter, a digital unit (DU) may correspond to a digital unit (DU) in the LTE system and a central unit (CU) or a distributed unit (DU) in the NR system, but the present disclosure is not limited thereto, and may be a BS corresponding to a cell in the beyond 5G system. For convenience of descriptions, a DU in the LTE system will now be described, but the present disclosure is not limited thereto, and a unit corresponding to a DU in the NR system and the beyond 5G system may be applied.

Hereinafter, a base station is an entity that allocates resources to a terminal, and may be at least one of a gNode B, an eNode B, a Node B, a base station (BS), a radio access unit, a BS controller, a node on a network, a digital unit, distributed unit, and central unit. A terminal may include a user equipment (UE), a mobile station (MS), a cellular phone, a smartphone, a computer, or a multimedia system capable of performing a communication function. However, the present disclosure is not limited to the above example.

In particular, the present disclosure may be applied to the 3GPP new radio (NR) (5G mobile communication standard) system or the beyond 5G system. In the present disclosure, the term "terminals" may refer to not only mobile phones, NB-IoT devices, and sensors but also other wireless communication devices.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of each user in a manner that time-frequency resources for carrying the data or control information of each user are allocated and managed not to overlap each other, that is, to achieve orthogonality therebetween.

As post-LTE communication systems need to support services capable of freely reflecting and simultaneously satisfying various requirements of users, service providers, and the like. For example, services considered for the 5G communication systems include enhanced mobile broadband (eMBB), massive machine-type communication (mMTC), ultra-reliability low-latency communication (URLLC) services, or the like. For convenience of descriptions, the present disclosure uses terms and names defined in the 3GPP LTE or NR standards. However, the present disclosure is not limited to these terms and names, and may be equally applied to communication systems conforming to other standards. Although LTE, LTE-A, LTE Pro, 5G (NR), or 6G (or beyond 5G) systems are mentioned as examples in the embodiments of the present disclosure, the embodiments of the present disclosure may also be applied to other communication systems having similar technical backgrounds or channel types. Furthermore, the embodiments of the present disclosure may also be applied to other communication systems through partial modification without greatly departing from the scope of the present disclosure based on determination by one of ordinary skill in the art.

FIG. 1 illustrates a method of managing mobility of a UE according to an embodiment of the present disclosure.

Referring to FIG. 1, a satellite communication system may include a satellite 100, a UE 140, a ground station 110 (or a BS, or the like), and a network entity 120 or 130. The network entity may include a first entity 120 for processing mobility management, and a second entity 130 for calculating mobility. In an embodiment, the first entity 120 and the second entity 130 may be the same network entity or separate network entities. For example, the first entity 120 is an entity for managing mobility, and may be an MME in the LTE system and may be an AMF in the NR system, however, the present disclosure is not limited thereto, and the first entity 120 may be an entity for managing mobility in the beyond 5G system. Also, the second entity 130 is an entity for calculating mobility, and may be an MME in the LTE system and may be an AMF or a NWDAF in the NR system, however, the present disclosure is not limited thereto, and the second entity 130 may be an entity for calculating mobility in the beyond 5G system. In an embodiment, the satellite 100 located at a high place with an altitude of 100 km or more by a rocket may transmit or receive signals to or from a UE 140 on the ground, and may transmit or receive signals to or from a ground station 110. Also, a plurality of satellite communication cells may exist within coverage 170 of a satellite. In an embodiment, the ground station 110 may transmit or receive signals to or from the satellite 100 by wirelessly, and may transmit or receive signals to or from the network entity 120 or 130 by wire or wirelessly.

In an embodiment, the UE 140 is in an idle state, and may be located within a first satellite communication cell 150 within the coverage 170 of the satellite. However, a cell to which the UE 140 was last-connected before switching to the idle state or a cell to which the UE 140 in a connected state was last-connected may not be the first satellite communication cell 150. As the satellite moves very fast depending on altitudes, a cell to which the UE belongs may be changed once per very short time. Therefore, when a registration area update (RAU) is performed in the same manner as in a ground network, all UEs have to frequently perform an RAU, and when paging to a UE is performed in the same manner as in the ground network, i.e., when paging is attempted via a cell to which the UE was last-connected, most of the attempts fail, such that power consumption of the UE increases, a processing load of a BS and a mobile communication network increases, and overhead due to the paging may excessively increase. Therefore, there is a need for new RA definition and paging scheme in a satellite communication network.

In an embodiment, satellite communication cells constituting an RA may be disposed to be arranged in a band shape extending in a relative movement direction of a satellite with respect to the ground. For example, an RA with a band shape may be configured, in consideration of the Earth's rotation, mobility of the satellite, or the like. Therefore, a UE may perform an RAU less frequently. In an embodiment, an RA may be pre-defined when satellite mobile communication is configured. For example, when a cell to which the UE 140 was last-connected is a second satellite communication cell 160 and a cell in which the UE is currently present is the first satellite communication cell 150, the UE in the idle state may still locate in an RA including the second satellite communication cell 160. Therefore, the UE 140 does not exit the RA and thus may not perform an RAU. According to an embodiment, power consumption for mobility management with respect to the UE in the idle state may be decreased, and communication network overhead for managing and tracking the UE in the idle state may be decreased.

In an embodiment, the first entity 120 may transmit a paging request message to a cell in which the UE is estimated, by the second entity 130, to be present, not the second satellite communication cell 160 to which the UE 140 is last-connected. For example, the second entity 130 may determine a cell in which the UE 140 is estimated to be located, based on the Earth's rotation, a movement routh of the satellite, a movement speed of the satellite, or the like, and may inform the first entity 120 of the cell in which the UE 140 is estimated to be located. Accordingly, the first entity 120 may transmit a paging request message to a cell in which the UE is estimated to be located, not a cell to which the UE was last-connected. In an embodiment, based on the first satellite communication cell 160 to which the UE is last-connected and a relative movement of at least one satellite with respect to the ground, the cell in which the UE is estimated to be located may be the second satellite communication cell 150 corresponding to a ground location of the UE 140 when the UE 140 is last-connected to the first satellite communication cell 160. According to an embodiment, delay time consumed to perform paging on the UE in the idle state may be decreased. Also, an area (e.g.: paging area) for which paging is attempted may be decreased, such that efficient paging may be performed.

Figure 2:
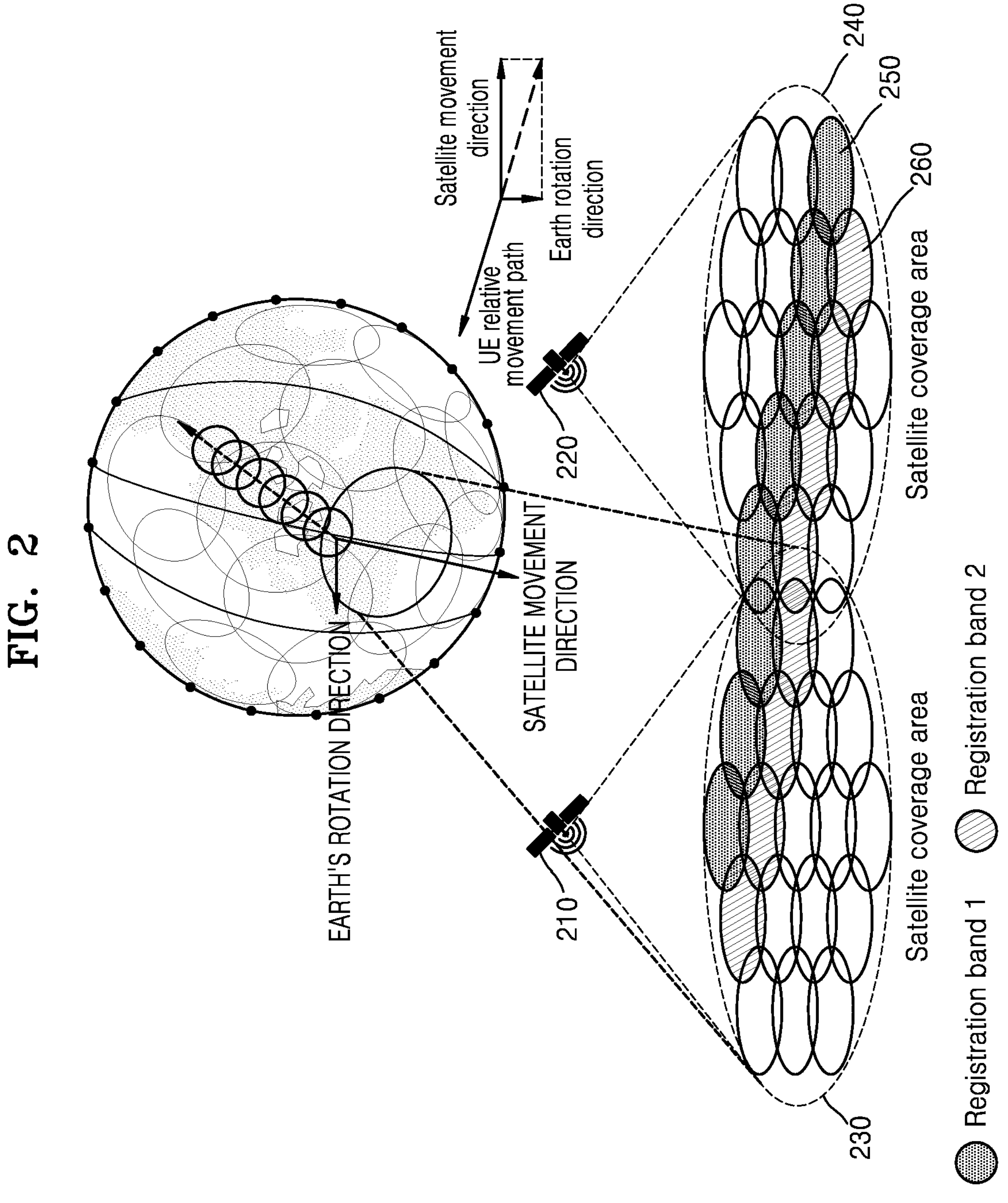
FIG. 2 illustrates a method of configuring a registration area (RA) according to an embodiment of the present disclosure.

FIG. 2 illustrates a method of configuring an RA according to an embodiment of the present disclosure.

Referring to FIG. 2, the RA may include satellite communication cells of at least one satellite. Also, the RA may have a band shape extending in a relative movement direction of a satellite with respect to the ground, according to the Earth's rotation and a movement of the satellite. For example, a first RA 250 and a second RA 260 may have a shape extending in the relative movement direction of the satellite with respect to the ground and may include one or more cells within first satellite coverage 230 of a first satellite 210 and one or more cells within second satellite coverage 240 of a second satellite 220.

In an embodiment, a relative movement path of a UE with respect to a satellite may be determined based on a total sum of an Earth's rotation speed vector and a movement speed vector of the satellite. The satellite may move with a speed determined according to an altitude, may move on a predetermined route, and may adjust its location when deviating from its route. Accordingly, the RA may be determined in advance, in consideration of the movement of the satellite and the Earth's rotation.

Satellites for communication may be divided into a low earth orbit (LEO) satellite, a middle earth orbit (MEO) satellite, a geostationary earth orbit (GEO) satellite, and the like, according to orbits of the satellites. In general, the GEO satellite may refer to a satellite at an altitude of about 36,000 km, the MEO satellite may refer to a satellite at altitudes of about 5,000 to 15,000 km, and the LEO satellite may refer to a satellite at altitudes of about 500 to 1,000 km. A cycle of revolution around the earth may vary according to altitudes, and in a case of the GEO, its cycle of revolution around the earth is about 24 hours, in a case of the MEO, its cycle of revolution around the earth is about 6 hours, and in a case of the LEO, its cycle of revolution around the earth is about 90 to 120 minutes. A satellite at a low orbit (up to 2,000 km) may have advantage in propagation delay and loss of radio waves, due to its relatively low altitude, compared to a satellite at a stationary orbit (36,000 km). Therefore, descriptions below are provided with respect to a low-orbit satellite, but the present disclosure is not limited thereto, and a different satellite may be applied to an embodiment of the present disclosure.

In an embodiment, a satellite may configure satellite coverage via multiple beams, and one beam may correspond to a cell in a ground network. For example, the first satellite 210 may configure first satellite coverage 230 via multiple beams, and the second satellite 220 may configure second satellite coverage 240 via multiple beams. For example, a beam size of a satellite may be 53.01 km at a minimum, and satellite coverage may be about 3890.01 km. Accordingly, when one satellite coverage is configured of an RA, a high paging load may occur by tracking and paging a UE in an idle state in a wide-ranging area. Alternatively, when an RA is configured as an area smaller than coverage of a satellite, a UE may have to perform an RAU frequently (e.g.: an interval of 24 seconds) due to a fast speed (e.g.: 26,000 km per hour) of the satellite. Accordingly, a high RAU signaling load may occur. According to an embodiment, as an RA is configured with a band shape extending in a relative movement direction of a satellite with respect to the ground, according to the Earth's rotation and movement of the satellite, a stationary UE performs an RAU less frequently, such that power consumption of the UE may be decreased, and a paging load may be lower than an RA of a satellite coverage unit.

In an embodiment, a UE may receive a broadcast signal, thereby determining whether a BS is a ground network or a satellite network. Accordingly, when the BS is the ground network, an RA corresponding to the ground network may be applied thereto, and when it is the satellite network, an RA corresponding to the satellite network may be applied thereto. In an embodiment, the broadcast signal may include a synchronization signal block (SSB), a primary synchronization signal (PSS), a secondary synchronization signal (SSS), a master information block (MIB) of a physical broadcast channel (PBCH), a system information block (SIB), or the like, but the present disclosure is not limited thereto and may include a signal being broadcast.

In an embodiment, the UE may determine whether the BS is the satellite network or the ground network, based on an identifier for identifying the satellite network or the ground network, the identifier being included in the broadcast signal. For example, the identifier may include information including cell information such as a physical cell identification (PID), a PSS/SSS sequence, a public land mobile network ID (PLMN ID), or the like, but the present disclosure is not limited thereto and may include a new identifier for identifying the satellite network or the ground network.

Figure 3:
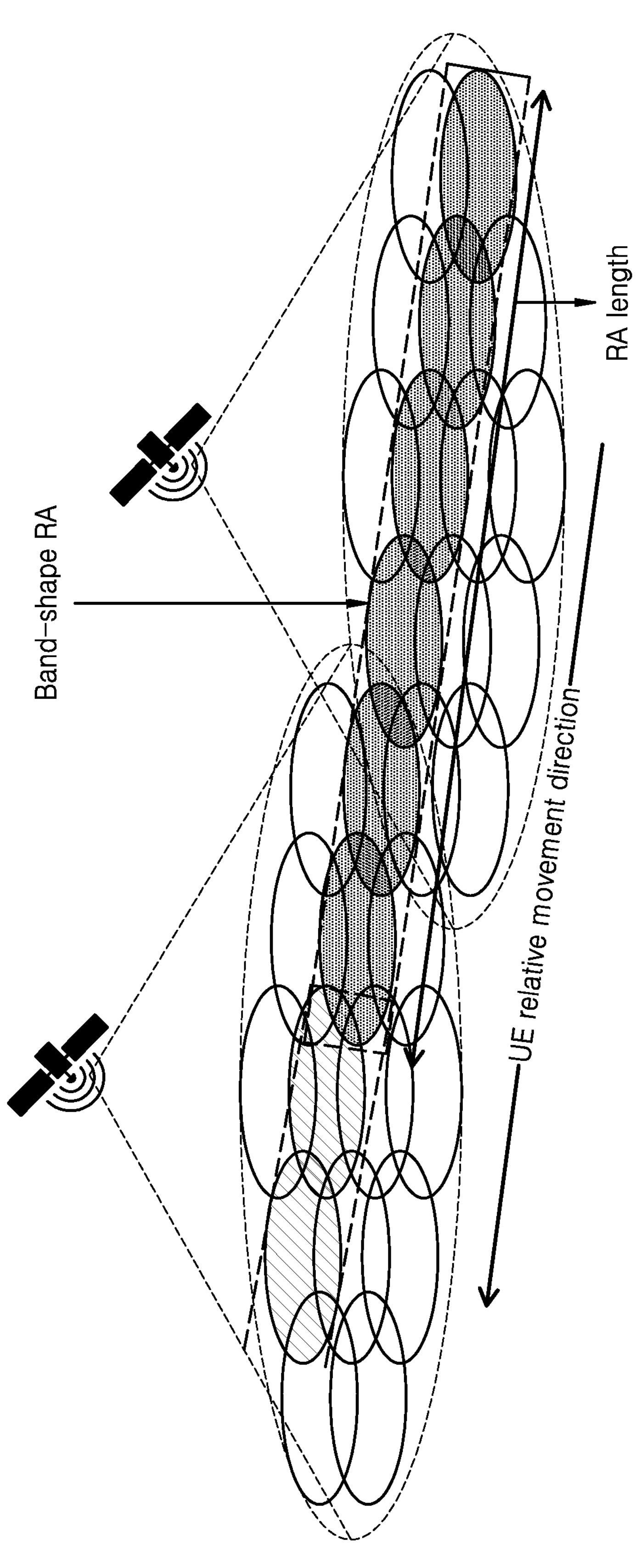
FIG. 3 illustrates a method of configuring an RA according to an embodiment of the present disclosure.

FIG. 3 illustrates a method of configuring an RA according to an embodiment of the present disclosure.

Referring to FIG. 3, satellite communication cells constituting the RA may be disposed to be arranged in a band shape extending in a relative movement direction of a satellite with respect to the ground. In an embodiment, the RA may be configured according to a relative movement direction of a UE with respect to the satellite, based on the Earth's rotation, movement of the satellite, or the like. The RA may be pre-defined in configuration of satellite mobile communication, and a length of the RA may be determined to be within a range of one satellite coverage or within a coverage range of a plurality of satellites. For example, the RA may have a band shape extending in a relative movement direction of a satellite with respect to the ground, and may further include a portion of coverage of another satellite, in addition to a coverage range of the satellite. In an embodiment, an appropriate length of the RA may be selected based on a movement speed of the satellite.

Figure 4:
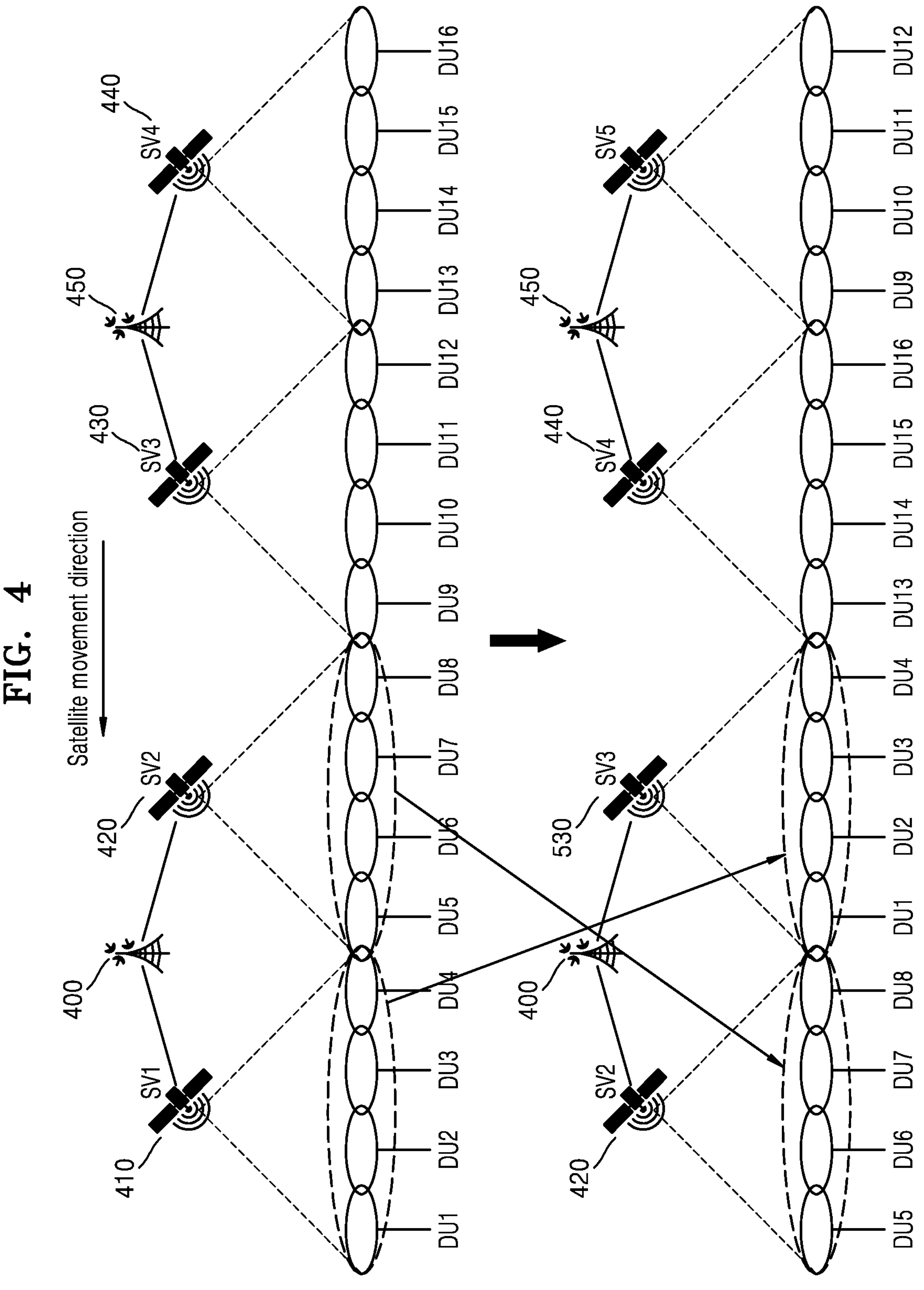
FIG. 4 illustrates a method of matching a cell and a base station (BS) according to an embodiment of the present disclosure.

FIG. 4 illustrates a method of matching a cell and a BS according to an embodiment of the present disclosure.

Referring to FIG. 4, a satellite communication cell management apparatus may connect satellite communication cells to BSs, and may update connections between the BSs and the satellite communication cells, according to a relative movement of at least one satellite with respect to the ground. Here, the BS may correspond to a digital unit (DU) in the LTE system and a central unit (CU) or a distributed unit (DU) in the NR system, but the present disclosure is not limited thereto, and may be a BS corresponding to a cell in the beyond 5G system. For convenience of descriptions, a DU in the LTE system will now be described, but the present disclosure is not limited thereto, and a unit corresponding to a DU in the NR system and the beyond 5G system may be applied.

In an embodiment, a first ground station 400 may connect satellite communication cells of satellites to DUs managed by the first ground station 400. When satellite communication cells in a management area of the first ground station 400 are changed according to a relative movement of at least one satellite with respect to the ground, connections between satellite communication cells exiting from the management area of the first ground station 400 and DUs connected to the corresponding cells may be released, and satellite communication cells entering the management area of the first ground station 400 and the DUs may be connected to each other. Also, connections between the DUs and remaining cells may be maintained. That is, for cells that are still present in a management area of a ground station, in spite of the relative movement of the satellite, connections between DUs and the cells may be maintained.

For example, the first ground station 400 may connect satellite communication cells of a first satellite 410 and a second satellite 420 to DU1 to DU8 managed by the first ground station 400. When satellite communication cells of the first satellite 410 exit from the management area of the first ground station 400, and satellite communication cells of a third satellite 430 enter the management area of the first ground station 400, according to a relative movement of at least one satellite with respect to the ground, the first ground station 400 may release connections between the satellite communication cells of the first satellite 410 and DU1 to DU4 connected to the satellite communication cells of the first satellite 410, and may connect the satellite communication cells of the third satellite 430 to DU1 to DU4. Also, as satellite communication cells of the second satellite 420 are still present in the management area of the first ground station 400, in spite of the movement of the satellite, the satellite communication cells of the second satellite 420 may be continuously managed by DU5 to DU8.

Figure 5:
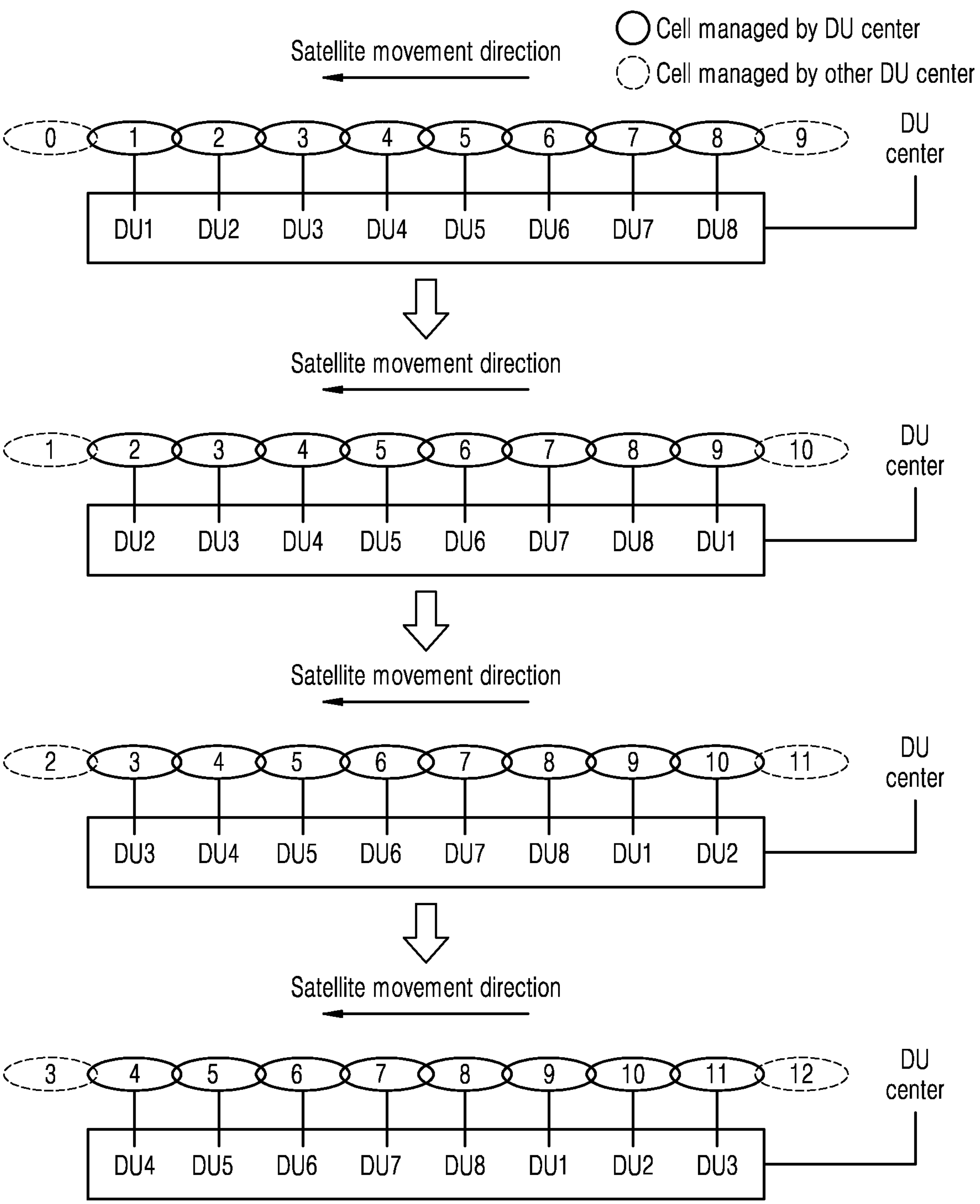
FIG. 5 illustrates a method of matching a cell and a BS according to an embodiment of the present disclosure.

FIG. 5 illustrates a method of matching a cell and a BS according to an embodiment of the present disclosure.

Referring to FIG. 5, a satellite communication cell management apparatus for managing satellite communication cells of at least one satellite may connect satellite communication cells in a management area of a DU center to DUs of the DU center. In an embodiment, when a first satellite communication cell exits from the management area of the DU center and a second satellite communication cell enters the management area of the DU center according to a relative movement of at least one satellite with respect to the ground, a satellite communication cell management apparatus may release a connection between the first satellite communication cell and a first DU connected to the first satellite communication cell and may connect the second satellite communication cell to the first DU. Also, cells that are still present in the management area of the DU center, in spite of the relative movement of at least one satellite with respect to the ground, may maintain connections between the cells and a DU.

For example, the DU center may manage DU1 to DU8. Accordingly, the satellite communication cell management apparatus may connect the first satellite communication cell to DU1, may connect the second satellite communication cell to DU2, may connect a third satellite communication cell to DU3, may connect a fourth satellite communication cell to DU4, may connect a fifth satellite communication cell to DU5, may connect a sixth satellite communication cell to DU6, may connect a seventh satellite communication cell to DU7, and may connect an eighth satellite communication cell to DU8. When the first satellite communication cell exits from the management area of the DU center and a ninth satellite communication cell enters the management area of the DU center according to the relative movement of at least one satellite with respect to the ground, the satellite communication cell management apparatus may release a connection between the first satellite communication cell and DU1 and may connect the ninth satellite communication cell to DU1. Here, as the second satellite communication cell, the third satellite communication cell, the fourth satellite communication cell, the fifth satellite communication cell, the sixth satellite communication cell, the seventh satellite communication cell, and the eighth satellite communication cell are still present in the management area of the DU center, connections to DU2 to DU8 may be maintained.

Also, for example, when the second satellite communication cell exits from the management area of the DU center and a tenth satellite communication cell enters the management area of the DU center according to the relative movement of at least one satellite with respect to the ground, the satellite communication cell management apparatus may release a connection between the second satellite communication cell and DU2 and may connect the tenth satellite communication cell to DU2.

Therefore, according to an embodiment, when a specific satellite communication cell exits from the management area of the DU center according to a relative movement of at least one satellite with respect to the ground, the satellite communication cell management apparatus may release a connection between the satellite communication cell exiting from the management area and a DU connected to the satellite communication cell exiting from the management area. Also, when another satellite communication cell enters the management area of the DU center, the satellite communication cell management apparatus may connect may connect the other satellite communication cell entering the management area to the DU whose connection to the satellite communication cell exiting from the management area is released. Also, the satellite communication cell management apparatus may efficiently operate DUs by maintaining connections between the DUs and satellite communication cells being still present in the management area.

Figure 6:
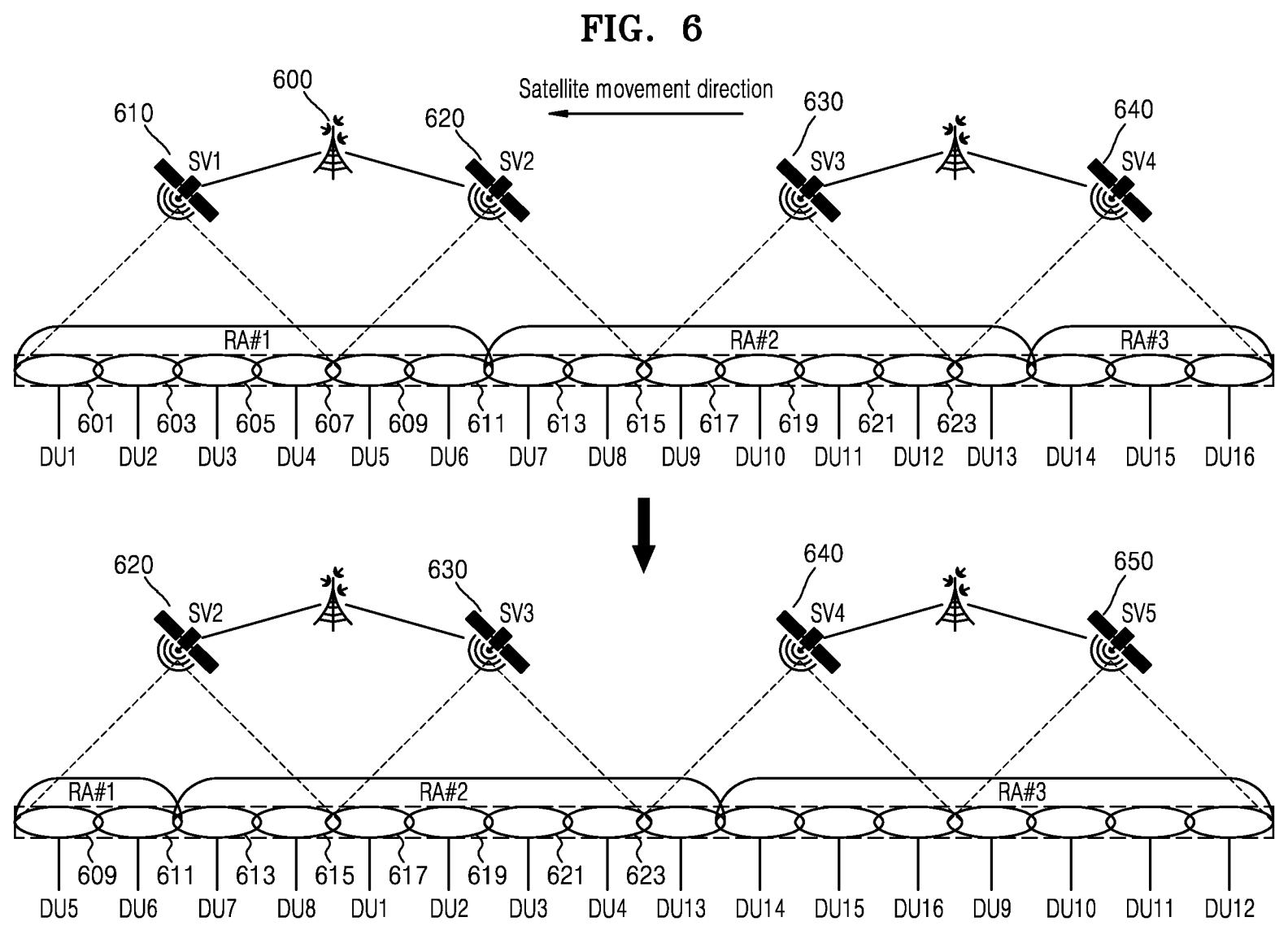

FIG. 6 illustrates a movement of an RA according to a movement of a satellite communication cell according to an embodiment of the present disclosure.

Referring to FIG. 6, a connection between a cell and a BS does not change in a ground network, but in a satellite network, even a satellite communication cell moves according to a movement of a satellite, when a connection between the satellite communication cell and a BS that manages the satellite communication cell is disconnected, the satellite communication cell has to be connected to a new BS. Also, an RA region may also move according to the movement of the satellite communication cell.

For example, RA #1 may include a first satellite communication cell 601, a second satellite communication cell 603, a third satellite communication cell 605, and a fourth satellite communication cell 607 which are provided by a first satellite 610, and a fifth satellite communication cell 609 and a sixth satellite communication cell 611 which are provided by a second satellite 620. Also, a seventh satellite communication cell 613 and an eighth satellite communication cell 615 which are provided by the second satellite 620, a ninth satellite communication cell 617, a tenth satellite communication cell 619, an eleventh satellite communication cell 621, and a twelfth satellite communication cell 623 which are provide by a third satellite 630 may be included in RA #2. Here, the first satellite communication cell 601 may be managed by DU1, the second satellite communication cell 603 may be managed by DU2, the third satellite communication cell 605 may be managed by DU3, the fourth satellite communication cell 607 may be managed by DU4, the fifth satellite communication cell 609 may be managed by DU5, the sixth satellite communication cell 611 may be managed by DU6, the seventh satellite communication cell 613 may be managed by DU7, the eighth satellite communication cell 615 may be managed by DUB, the ninth satellite communication cell 617 may be managed by DU9, the tenth satellite communication cell 619 may be managed by DU10, the eleventh satellite communication cell 621 may be managed by DU11, and the twelfth satellite communication cell 623 may be managed by DU12. In an embodiment, as the first satellite 610 exits from a range of a management area by a ground station 600 according to a movement of at least one satellite, respective connections between the first satellite communication cell 601, the second satellite communication cell 603, the third satellite communication cell 605, and the fourth satellite communication cell 607 and DU1, DU2, DU3, and DU4 may be disconnected. Also, as the third satellite 630 enters the management area of the ground station 600 according to a movement of at least one satellite, the ninth satellite communication cell 617, the tenth satellite communication cell 619, the eleventh satellite communication cell 621, and the twelfth satellite communication cell 623 of the third satellite 630 may be respectively connected to DU1, DU2, DU3, and DU4.

In an embodiment, as an RA pre-defines a group pf satellite communication cells in configuration of satellite communication, the RA may also move according to a movement of a satellite. According to an embodiment, satellite communication cells and BSs are operated in correspondence to a pre-configured RA, in consideration of a movement of a satellite, such that efficient satellite communication may be provided.

Figure 7:
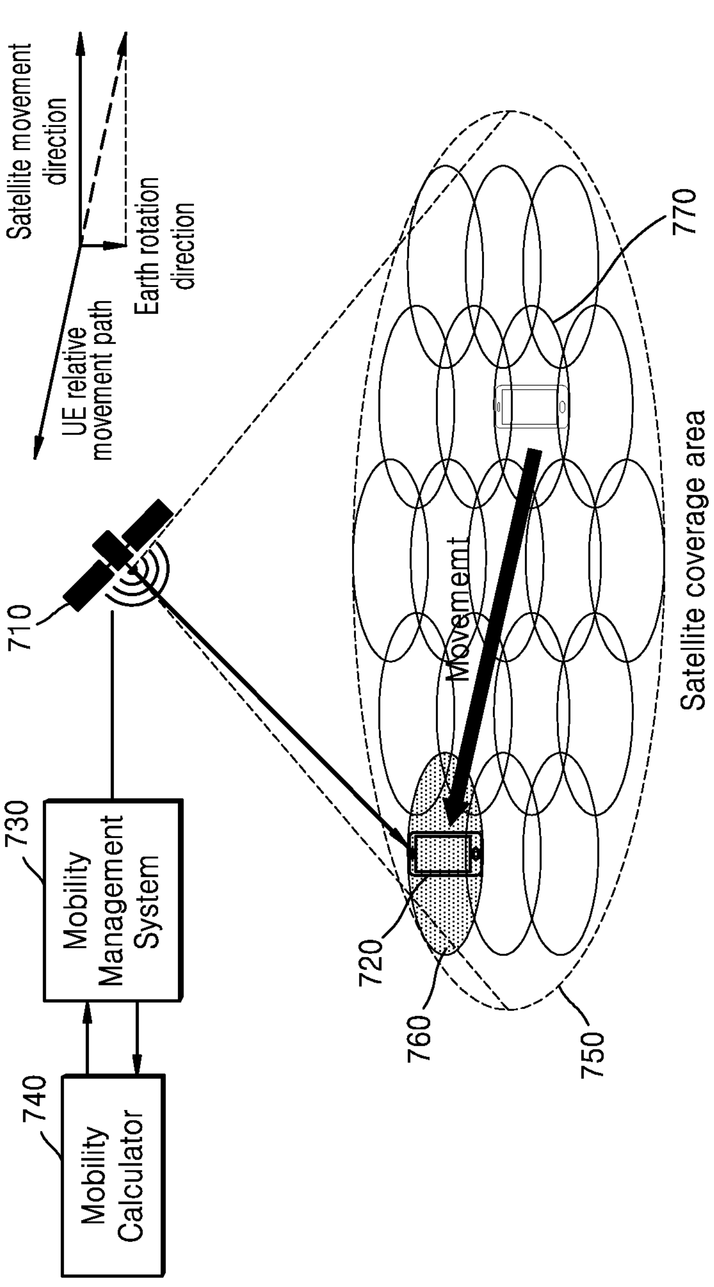
FIG. 7 illustrates a method of managing mobility of a UE by tracking a ground location of the UE according to an embodiment of the present disclosure.

FIG. 7 illustrates a method of managing mobility of a UE by tracking a ground location of the UE according to an embodiment of the present disclosure.

Referring to FIG. 7, a satellite communication cell to which a UE 720 is last-connected may be a first satellite communication cell 770. In an embodiment, when performing paging on the UE 720 in an idle state, a mobility management network entity 730 may transmit, based on the first satellite communication cell 770 and a relative movement of at least one satellite with respect to the ground, a paging message to a second satellite communication cell 760 corresponding to a ground location of the UE when the UE 720 was last-connected to the first satellite communication cell 770.

In an embodiment, the mobility management network entity 730 may determine the second satellite communication cell 760 that corresponds to the ground location of the UE when the UE 720 was last-connected to the first satellite communication cell 770. In another embodiment, the mobility management network entity 730 may request a mobility calculation network entity 740 to calculate the ground location of the UE when the UE 720 was last-connected to the first satellite communication cell 770 or the second satellite communication cell 760 corresponding to the location, may receive a result of the calculation from the mobility calculation network entity 740, and thus, may determine the second satellite communication cell 760 corresponding to the location. In another embodiment, the mobility management network entity 730 may request the mobility calculation network entity 740 to calculate the ground location of the UE when the UE 720 was last-connected to the first satellite communication cell 770 or the second satellite communication cell 760 corresponding to the location, the mobility calculation network entity 740 may determine the second satellite communication cell 760 corresponding to the location of the UE on the ground when the UE was last-connected to the first satellite communication cell 770, the mobility management network entity 730 may identify the second satellite communication cell 760 by receiving information of the determined second satellite communication cell 760 from the mobility calculation network entity 740.

In an embodiment, the mobility management network entity 730 or the mobility calculation network entity 740 may determine, based on the Earth's rotation and a movement of a satellite, the ground location of the UE 720 when the UE 720 was last-connected to the first satellite communication cell 770. For example, the second satellite communication cell 760 may be determined, based on a vector having a same size and an opposite direction with respect to a sum vector of an Earth's rotation speed vector and a movement speed vector of the satellite. In an embodiment, when determining the second satellite communication cell 760, topology of satellite communication cells may be additionally considered.

If a paging message is transmitted to a cell to which a UE was last-connected, a probability of a paging failure increases such that overhead due to paging may increase in a satellite network as in a ground network. However, according to an embodiment, a satellite communication cell corresponding to a ground location of the UE is determined by considering information of the cell to which the UE was last-connected, the Earth's rotation, and a movement of the satellite, such that overhead due to paging may decrease.

Figure 8:
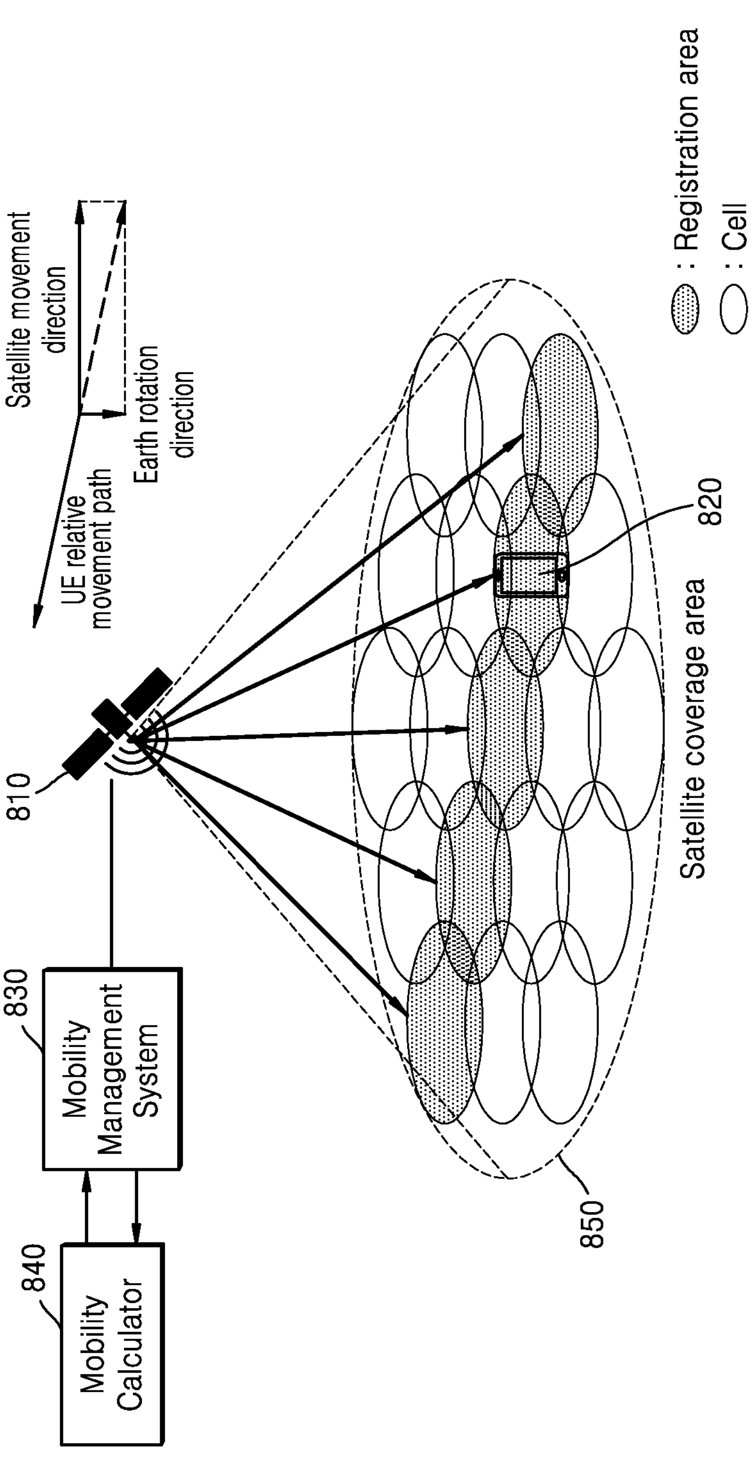
FIG. 8 illustrates a method of managing mobility of a UE in an RA by tracking a ground location of the UE according to an embodiment of the present disclosure.

FIG. 8 illustrates a method of managing mobility of a UE in an RA by tracking a ground location of the UE according to an embodiment of the present disclosure.

Referring to FIG. 8, when a mobility management network entity 830 fails in paging with respect to a UE as the UE does not locate in a satellite communication cell (Pred_Cell) that corresponds to a ground location of the UE when a UE 820 is last-connected to the cell to which the UE was last-connected, the mobility management network entity 830 may transmit a paging message satellite communication cells in a wider range than one satellite communication cell. For example, when the mobility management network entity 830 does not receive a paging response until an expiry of a timer or receives a paging failure message before an expiry of the running timer, the timer being started when a paging request message was transmitted via Pred_Cell, the mobility management network entity 830 may identify a failure of the paging via Pred_Cell.

In an embodiment, the mobility management network entity 830 that identified the failure of the paging via Pred_Cell may transmit, to a BS, a paging request message in a wider range than Pred_Cell, e.g., via satellite communication cells constituting an RA including Pred_Cell. Accordingly, the BS may configure and transmit a paging message to a satellite 810. The satellite 810 may transmit the paging message to satellite communication cells included in the RA which are among satellite communication cells within its satellite coverage 850. In an embodiment, the satellite communication cells included in the RA may be the satellite communication cells constituting the RA including the satellite communication cell corresponding to a ground location of the UE when the UE 820 is last-connected to the cell to which the UE was last-connected. However, the present disclosure is not limited thereto, and the satellite 810 may transmit the paging message only to some of the satellite communication cells included in the RA among the satellite communication cells within its satellite coverage 850, or may transmit the paging message even to other satellite communication cells in addition to the satellite communication cells included in the RA among the satellite communication cells within its satellite coverage 850.

In an embodiment, as a result of the failure in paging to the UE from the satellite communication cell corresponding to the ground location of the UE when the UE is last-connected to the cell to which the UE was last-connected, the network entities 830 and 840, the BS, and the satellite 810 may attempt paging to the UE while they gradually broaden a range of satellite communication cells until they succeed in paging. For example, the mobility management network entity 830 may run a first timer while transmitting the paging request message to some of the satellite communication cells included in the RA among the satellite communication cells within the satellite coverage 850. If the mobility management network entity 830 does not receive a paging response until an expiry of the first timer or receives a paging failure message before the expiry of the first timer, the mobility management network entity 830 may run a second timer while transmitting, to the BS, a paging request message via all of the satellite communication cells included in the RA among the satellite communication cells within the satellite coverage 850. Also, if the mobility management network entity 830 does not receive whether or not paging is successful until an expiry of the second timer or receives a paging failure message before the expiry of the second timer, the mobility management network entity 830 may start a third timer while transmitting a paging request message via a plurality of satellites providing the satellite communication cells constituting at least a portion of the RA. Also, if the mobility management network entity 830 does not receive whether or not paging is successful until an expiry of the third timer or receives a paging failure message before the expiry of the third timer, the mobility management network entity 830 may start a fourth timer while transmitting a paging request message via all of the satellite communication cells included in the RA among the satellite communication cells within the satellite coverage 850 and satellite communication cells neighboring the RA. Also, if the mobility management network entity 830 does not receive whether or not paging is successful until an expiry of the fourth timer or receives a paging failure message before the expiry of the fourth timer, the mobility management network entity 830 may start a fifth timer while transmitting a paging request message via all satellite communication cells within the satellite coverage 850. In an embodiment, the first to fifth timers may be all the same timer or different timers, or some of them may be the same timer while others may be different timers.

In an embodiment, when all satellite communication cells within the satellite coverage 850 fail in paging to the UE, the mobility management network entity 830 may transmit a paging request message via satellite communication cells of other satellite. According to an embodiment, according to a result of calculation by the mobility calculation network entity 840 that calculates mobility based on a satellite communication cell to which a UE was last-connected and a relative movement of at least one satellite with respect to the ground, when paging in the satellite communication cell fails, the satellite communication cell corresponding to a ground location of the UE when the UE was last-connected to the satellite communication cell, paging may be attempted by gradually broadening a range of cells, based on movement information of a satellite, topology of cells, RA configuration, or the like, such that a paging attempt area may be decreased and thus, a delay time consumed to perform paging on the UE in an idle state may be decreased.

Figure 9:
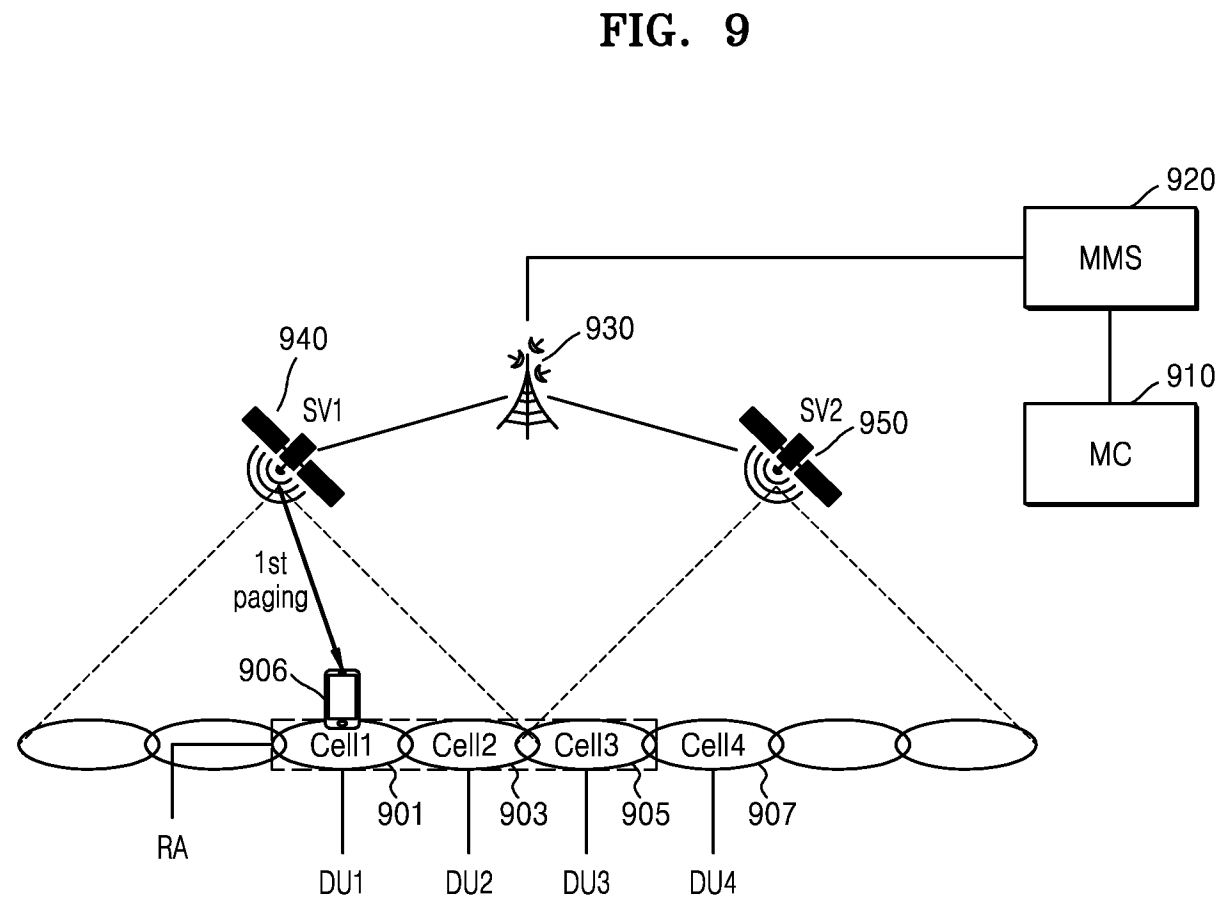

FIG. 9 illustrates a method of managing mobility of a UE by tracking a ground location of the UE according to an embodiment of the present disclosure.

Referring to FIG. 9, a mobility management system (MMS) 920 may be an MME in the LTE system and an AMF in the NR system, but the present disclosure is not limited thereto, and may be an entity for managing UE mobility in the beyond 5G system. Also, a mobility calculator (MC) 910 may be an MME in the LTE system and an AMF or a NWDAF in the NR system, but the present disclosure is not limited thereto, and may be an entity for managing mobility in the beyond 5G system.

In an embodiment, a first satellite 940 may provide a plurality of satellite communication cells including a first satellite communication cell 901 and a second satellite communication cell 903, and a second satellite 950 may provide a plurality of satellite communication cells including a third satellite communication cell 905 and a fourth satellite communication cell 907. Also, the first satellite communication cell 901 may be operated by DU1, the second satellite communication cell 903 may be operated by DU2, the third satellite communication cell 905 may be operated by DU3, and the fourth satellite communication cell 907 may be operated by DU4.

In an embodiment, when there is a need to perform paging on the UE 960 in an idle state, e.g., when there is data to be transmitted to the UE 960, the MMS 920 may request the MC 910 for information about a cell in which the UE is currently located. The MC 910 may calculate a satellite communication cell corresponding to a ground location of the UE when the UE was last-connected to a cell to which the UE was last-connected, in consideration of a satellite communication cell to which the UE was last-connected, the Earth's rotation, a movement direction of a satellite, a movement speed of the satellite, or the like. Accordingly, the MC 910 may transmit, to the MMS 920, information about the satellite communication cell corresponding to the ground location of the UE when the UE was last-connected to the cell to which the UE was last-connected. Also, the MC 910 may further transmit, to the MMS 920, information about an RA of the UE. The MMS 920 may transmit, via a ground station 930, a paging request message to a satellite that provides the corresponding cell, based on the received information.

For example, when the satellite communication cell to which the UE was last-connected is the third satellite communication cell 905, the MC 910 may determine the first satellite communication cell 901 as the satellite communication cell corresponding to the ground location of the UE when the UE was last-connected to the third satellite communication cell 905, in consideration of the third satellite communication cell 905, the Earth's rotation, a movement direction of a satellite, a movement speed of the satellite, or the like. The MC 910 may transmit, to the MMS 920, information about the determined first satellite communication cell 901, and information indicating that an RA including the first satellite communication cell 901 includes the first satellite communication cell 901, the second satellite communication cell 903, and the third satellite communication cell 905. Also, based on the received information, the MMS 920 may transmit, via the ground station 930, a paging request message instructing to perform paging on a UE in the first satellite communication cell 901, to the first satellite 940 providing the first satellite communication cell 901. Accordingly, the first satellite 940 may attempt paging to the UE 960 in the first satellite communication cell 901. According to an embodiment, a paging message is transmitted to a satellite communication cell corresponding to a ground location of a UE when the UE was last-connected to the satellite communication cell to which the UE was last-connected, such that a probability of paging success may be increased and overhead due to paging may be decreased.

Figure 10:
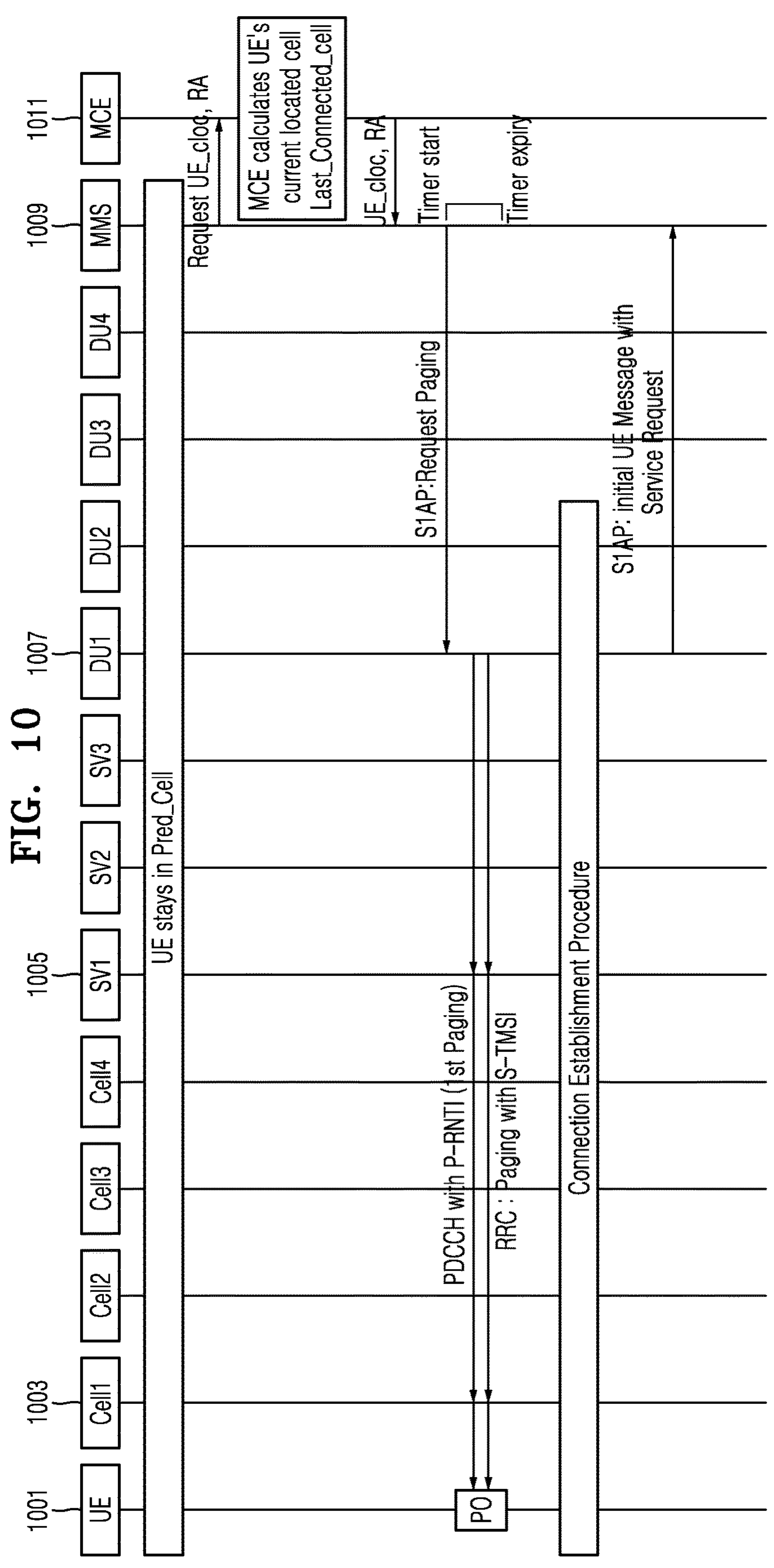
FIG. 10 illustrates a flowchart of a method of managing mobility of a UE by tracking a ground location of the UE according to an embodiment of the present disclosure.

FIG. 10 illustrates a flowchart of a method of managing mobility of a UE by tracking a ground location of the UE according to an embodiment of the present disclosure.

Referring to FIG. 10, a UE 1001 may be located in a cell (Pred_Cell) corresponding to a cell to which the UE is last-connected to the cell to which the UE was last-connected. In an embodiment, an MMS 1009 that may correspond to an MME in the LTE system or an AMF in the NR system may identify that there is a need to perform paging on a UE. For example, when there is a traffic forward to the UE, the MMS 1009 may identify necessity for paging. In an embodiment, when the MMS 1009 identifies the necessity for paging, the MMS 1009 may request a mobility calculator entity (MCE) 1011 for information indicating in which cell the UE currently is located, and information about an RA of the UE. The MCE 1011 may calculate and estimate a cell in which the UE may be currently located, based on a satellite communication cell to which the UE was last-connected, and a relative movement of at least one satellite with respect to the ground.

For example, the MCE 1011 may identify the cell (Pred_Cell) corresponding to a location above the ground of the cell to which the UE is last-connected when the UE was last-connected, based on the Earth's rotation speed and a movement speed of a satellite. Also, the MCE 1011 may identify, based on the identified cell, an RA including the identified cell. The MCE 1011 may transmit, to the MMS 1009, information about the cell (Pred_Cell) corresponding to the location above the ground of the cell to which the UE is last-connected when the UE was last-connected and the identified RA.

In an embodiment, based on the plurality of pieces of information received from the MCE 1011, the MMS 1009 may transmit a paging request message to the cell (Pred_Cell) corresponding to the location above the ground of the cell to which the UE is last-connected when the UE was last-connected. For example, in a case where the cell (Pred_Cell) corresponding to the location above the ground of the cell to which the UE is last-connected when the UE was last-connected is a first cell 1003, the MMS 1009 may transmit the paging request message to a BS (e.g.: DU1 1007) that manages the first cell 1003. In an embodiment, the paging request message may be referred to as an S1AP paging message.

In an embodiment, the BS (e.g.: DU1 1007) that manages the first cell 1003 may configure and transmit a paging message to a first satellite 1005 providing the first cell 1003. For example, the BS having configured the paging message may transmit, on a physical downlink control channel (PDCCH), DCI attached with a cyclic redundancy check (CRC) scrambled by a paging radio network temporary identity (P-RNTI), to the UE 1001 via the first satellite 1005 and the first cell 1003, and may transmit the paging message with a s-temporary mobile subscriber identity (S-TMSI) on a PDSCH to the UE 1001. That is, the BS may transmit, to the UE, an RRC paging message on a paging control channel (PCCH) logical channel, a paging channel (PCH) transmit channel, a PDSCH physical channel, or the like.

In an embodiment, the UE 1001 may monitor a PDCCH, based on a P-RNTI on a subframe included in a paging occasion (PO) of the UE 1001. Also, when detecting the PDCCH masked with the P-RNTI, the UE 1001 may decode the DCI transmitted on the PDCCH. The DCI may indicate the UE 1001 with a PDSCH resource on which the paging message is transmitted. Therefore, the UE 1001 may decode the paging message from the PDSCH resource indicated by the DCI.

In an embodiment, the UE 1001 may receive the paging message and then may perform a connection establishment procedure with a BS 1007. As a result of performing the connection establishment procedure with the BS 1007, the UE 1001 may be switched from an idle mode (e.g.: RRC idle) to a connected mode (e.g.: RRC connected).

In an embodiment, after the BS 1007 completes the connection establishment procedure with the UE, the BS 1007 may transmit an initial UE message with a service request to a network entity (e.g.: the MMS 1009). Here, the service request and the initial UE message may be referred to as a paging response.

In an embodiment, the MMS 1009 may run a timer while transmitting the paging request message to the BS 1007. When paging to the UE succeeds before an expiry of the timer, the UE may be switched to a connected state. If paging fails because the UE 1001 is not located in the first cell 1003, the MMS 1009 may transmit a paging request message to a plurality of BSs. Accordingly, the paging message transmitted to the first cell 1003 identified by the MCE 1011 may be referred to as a paging request message #1, a first paging request message, or the like. When paging described above with reference to FIG. 10 fails, for example, when the timer is expired before paging succeeds or when a paging failure response is received before the timer is expired, a paging procedure with next-high priority may be performed. The paging procedure with next-high priority will now be described with reference to FIGS. 11 to 16.

Figure 11:
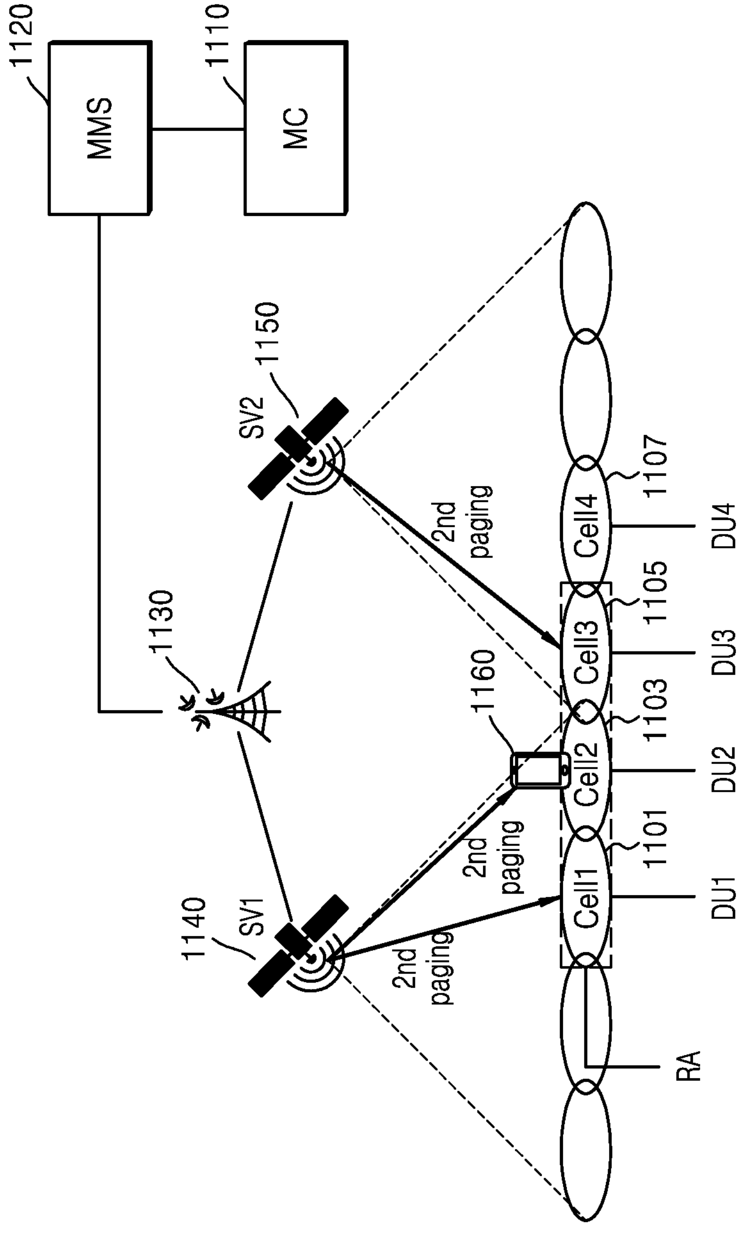
FIG. 11 illustrates a method of managing mobility of a UE in an RA by tracking a ground location of the UE according to an embodiment of the present disclosure.

FIG. 11 illustrates a method of managing mobility of a UE in an RA by tracking a ground location of the UE according to an embodiment of the present disclosure.

Referring to FIG. 11, when paging described above with reference to FIG. 10 fails or other paging attempt fails, paging to a UE in an idle state may be performed via a paging attempt in a wider range of cells. In an embodiment, when paging fails, an MMS 1120 may transmit a paging request message to cells in a wider range. For example, when the MMS 1120 does not receive a paging success message before an expiry of a timer started when the MMS 1120 transmits a paging request message to a BS 1130 via a first cell 1101, or does not receive a paging failure message before the expiry of the timer, that is, when paging via the first cell 1101 fails, the MMS 1120 may transmit a paging request message to cells in a wider range. In another embodiment, when paging fails, a satellite that failed paging may transmit a paging relay message to another satellite, and the other satellite having received the paging relay message may transmit the paging relay message to at least some of its satellite communication cells. That is, the paging relay message may be a paging re-retry request message via an interface between satellites in a case of paging failure. As the paging relay message is used, the number of times of signaling with respect to a core network, a paging delay time, or the like may be decreased. Also, satellite link performance may be low in the satellite network and thus communication performance with respect to the core network may also be low, however, the paging re-try message is transmitted via the interface between the satellites, not via the core network, such that communication performance may be increased.

In an embodiment, an MC 1110 may determine, as the first cell 1101, a cell corresponding to a ground location of a UE 1160 when the UE 1160 is last-connected to a satellite communication cell to which the UE 1160 was last-connected, based on the satellite communication cell to which the UE was last-connected and a relative movement of at least one satellite with respect to the ground, and may identify that an RA including the first cell 1101 includes the first cell 1101, a second cell 1103, and a third cell 1105. Accordingly, the MMS 1120 may transmit a paging request message to DU1 that manages the first cell 1101. DU1 may attempt paging to the UE via a first satellite 1140 providing the first cell 1101. However, because the UE 1160 is not located within the first cell 1101, the UE may not be paged. Accordingly, the MMS 1120 may transmit a paging request message to cells constituting the RA including the first cell 1101, based on RA information received from the MC 1110. That is, the MMS 1120 may transmit the paging request message to the first cell 1101, the second cell 1103, and the third cell 1105. The MMS 1120 may transmit the paging request message to DU1, DU2, and DU3, and a paging with respect to the UE may be requested if the UE is located in a cell, by transmitting the paging message from DU1 and DU2 via the first satellite 1140 and from DU3 via a second satellite 1150. In an embodiment, as the UE 1160 is located in the second cell 1103, paging to the UE in the second cell 1103 via the first satellite 1140 may be successfully performed. Accordingly, the UE 1160 may be switched to a connected state. If the UE is not located in the RA, paging described above with reference to FIG. 11 may fail. In this case, paging to the UE via cells in a wider range may be attempted.

FIG. 12 illustrates a method of managing mobility of a UE in an RA by tracking a ground location of the UE according to an embodiment of the present disclosure.

Referring to FIG. 12, a UE 1201 may not be located in a cell (Pred_Cell) corresponding to a cell to which the UE is last-connected to the cell to which the UE was last-connected but may be located within an RA region including Pred_Cell. In an embodiment, when an MMS 1231 that may correspond to an MME in the LTE system or an AMF in the NR system identifies that there is a need for paging, the MMS 1231 may request an MCE 1233 for information indicating in which cell the UE is currently located and information about an RA of the UE. The MCE 1233 may identify a satellite communication cell (Pred_Cell) corresponding to a ground location of the UE when the UE is last-connected to the satellite communication cell to which the UE was last-connected, based on the satellite communication cell to which the UE was last-connected, and a relative movement of at least one satellite with respect to the ground. Accordingly, the MMS 1231 may transmit a paging request to the identified satellite communication cell (Pred_Cell). This procedure may correspond to the paging method described above with reference to FIG. 10. However, as the UE 1201 is not located in Pred_Cell, the paging described with reference to FIG. 10 may fail. In an embodiment, the MMS 1231 does not receive a paging response until an expiry of a timer or receives a paging failure message before an expiry of the running timer, the timer being started when a paging message was transmitted to DU1 1221, and thus, the MMS 1231 may identify a paging failure and may search for a location of the UE in cells of a wider range. For example, an attempt of paging to the UE may be performed in cells that constitute an RA including Pred_Cell.

In an embodiment, the MMS 1231 may transmit a paging request message to BSs that manage satellite communication cells constituting the RA including Pred_Cell. For example, the RA including Pred_Cell may include a first satellite communication cell 1203, a second satellite communication cell 1205, and a third satellite communication cell 1207. That is, the MMS 1231 may transmit the paging request message to DU1 1221 managing the first satellite communication cell 1203, to DU2 1223 managing the second satellite communication cell 1205, and DU3 1225 managing the third satellite communication cell 1207. In an embodiment, the first satellite communication cell 1203 and the second satellite communication cell 1205 may be satellite communication cells provided by a first satellite 1211, and the third satellite communication cell 1207 may be a satellite communication cell provided by a second satellite 1213. Accordingly, DU1 1221 and DU2 1223 may configure and transmit a paging message to the first satellite 1211, and DU3 1225 may configure and transmit a paging message to the second satellite 1213. DU1 and DU2 that are the BSs having configured the paging message may transmit, on a PDCCH, DCI attached with a CRC scrambled by a P-RNTI, to the UE 1201 via the first satellite 1211 and the satellite communication cell. Also, DU3 that is the BS having configured the paging message may transmit, on a PDCCH, DCI attached with a CRC scrambled by a P-RNTI, to the UE 1201 via the second satellite 1211 and the third satellite communication cell 1207. Also, the BSs having configured the paging message may transmit the paging message with a S-TMSI on a PDSCH to the UE 1201. That is, the BS may transmit, to the UE, an RRC paging message on a PCCH logical channel, a PCH transmit channel, a PDSCH physical channel, or the like.

In an embodiment, the UE 1201 located in the second satellite communication cell 1205 may monitor a PDCCH, based on a P-RNTI on a subframe included in a PO of the UE 1201. Also, when detecting the PDCCH masked with the P-RNTI, the UE 1201 may decode the DCI transmitted on the PDCCH. The DCI may indicate the UE 1201 with a PDSCH resource on which the paging message is transmitted. Therefore, the UE 1201 may decode the paging message from the PDSCH resource indicated by the DCI.

In an embodiment, the UE 1201 may perform a connection establishment procedure with DU2 1223 corresponding to the BS managing the second satellite communication cell 1205. As a result of performing the connection establishment procedure with DU2 1223, the UE 1201 may be switched from an idle mode (e.g.: RRC idle) to a connected mode (e.g.: RRC connected).

In an embodiment, after DU2 1223 completes the connection establishment procedure with the UE 1201, DU2 1223 may transmit an initial UE message with a service request to a network entity (e.g.: the MMS 1009). Here, the initial UE message transmitted with the service request may be referred to as a paging response.

In an embodiment, the MMS 1231 may run a timer while transmitting the paging request message to the BSs. When paging to the UE succeeds before an expiry of the timer, the MMS 1231 may identify success of the paging. If paging described with reference to FIG. 12 fails because the UE 1201 is not located in the RA, the MMS 1009 may transmit a paging request message to a plurality of BSs of a wider range. That is, when the timer is expired before paging succeeds or when a paging failure message is received before the timer is expired, a paging procedure with next-high priority may be performed. The paging procedure with next-high priority will now be described with reference to FIGS. 13 to 16.

Figure 13:
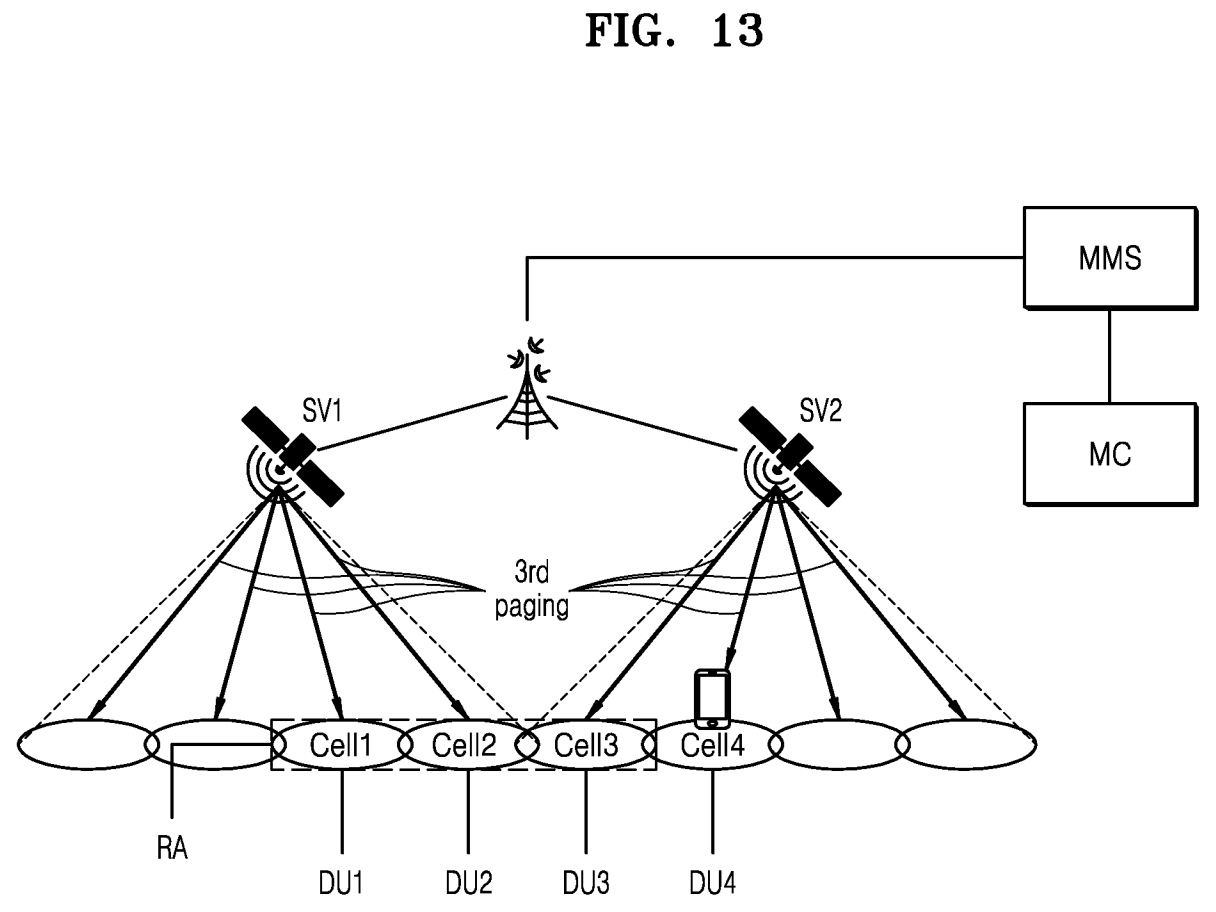

FIG. 13 illustrates a method of managing mobility of a UE in coverage of a satellite by tracking a ground location of the UE according to an embodiment of the present disclosure.

Referring to FIG. 13, when paging fails as the UE is not located in an RA, satellites that provide at least some of satellite communication cells included in the RA may transmit a paging request to satellite communication cells in their coverage. In an embodiment, a cell corresponding to a ground location of a UE when the UE is last-connected to the satellite communication cell to which the UE was last-connected may be Cell 3, and Cell 3 may be included in an RA configured of Cell 1, Cell 2, and Cell 3. When paging fails as the UE is not located in the RA, an MMS that may correspond to an MME in the LTE system or an AMF in the NR system may perform paging on an area wider than the RA.

In an embodiment, the MMS may attempt to transmit a paging request message to the satellites that provide at least some of satellite communication cells included in the RA. For example, a paging message may be transmitted to cells within satellite coverage of a first satellite SV1 providing Cell 1 and Cell 2 in the RA and to cells within satellite coverage of a second satellite SV2 providing Cell 3 in the RA. In an embodiment, the first satellite and the second satellite may transmit the paging message to all satellite communication cells within their coverage or may transmit the paging message to some satellite communication cells within their coverage. For example, the first satellite and the second satellite may transmit the paging message only to satellite communication cells neighboring the RA. In an embodiment, paging may be successfully performed on the UE is not present in the RA but is located within satellite coverage of the second satellite SV2. If the UE is not located within satellite coverage of the first satellite and the second satellite, paging described with reference to FIG. 13 may also fail. In this case, paging to the UE may be performed via cells of a wider range.

Figure 14:
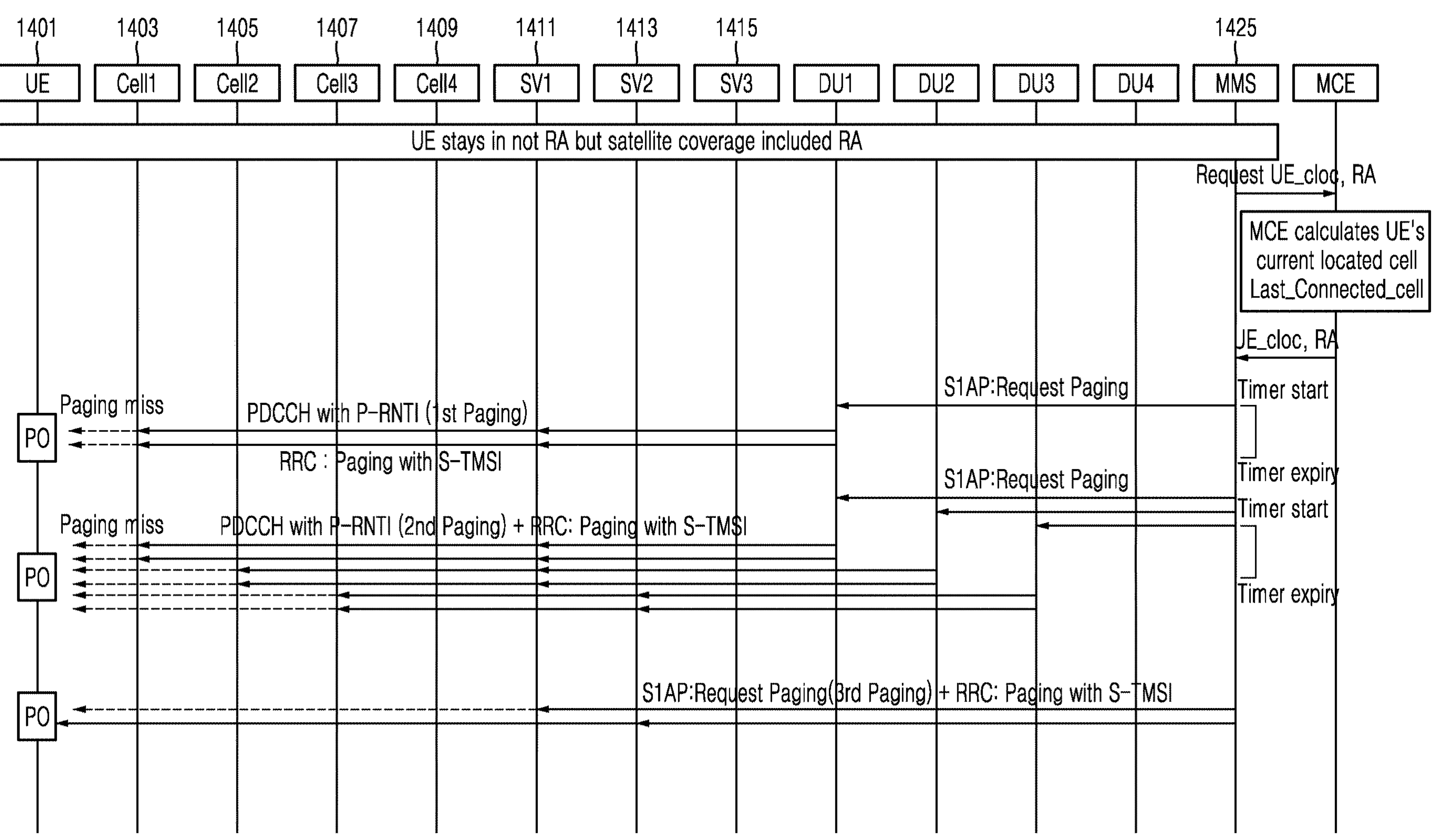
FIG. 14 illustrates a method of managing mobility of a UE in coverage of a satellite by tracking a ground location of the UE according to an embodiment of the present disclosure.

FIG. 14 illustrates a method of managing mobility of a UE in coverage of a satellite by tracking a ground location of the UE according to an embodiment of the present disclosure.

Referring to FIG. 14, the UE may not be located in an RA region including a cell (Pred_Cell) corresponding to a cell to which the UE is last-connected to the cell to which the UE was last-connected but may be located within satellite coverage including an RA. Therefore, the paging performed on Pred_Cell and cells in an RA described above with reference to FIGS. 10 and 12 may fail. In an embodiment, an MMS 1425 does not receive a paging response until an expiry of a timer or receives a paging failure message before an expiry of the timer, the timer being started when a paging request message was transmitted to Pred_Cell. Accordingly, as the MMS 1425 does not receive a paging response before an expiry of a timer or receives a paging failure message before the expiry of the timer, the timer being started when a paging request message is re-transmitted via cells included in the RA, the MMS 1425 may attempt paging while gradually broadening a range of satellite communication cells until paging succeeds.

In an embodiment, the MMS 1425 may transmit a paging request message to BSs connected to satellites via the satellites that provide at least some of satellite communication cells constituting an RA. For example, the RA may include a first satellite communication cell 1403, a second satellite communication cell 1405, and a third satellite communication cell 1407, and the first satellite communication cell 1403 and the second satellite communication cell 1405 may be provided by a first satellite 1411, and the third satellite communication cell 1407 and a fourth satellite communication cell 1409 may be provided by a second satellite 1413. In this case, based on paging failed in a satellite communication cell in the RA, the MMS 1425 may transmit a paging request message to the first satellite 1411 providing the first satellite communication cell 1403 and the second satellite communication cell 1405 in the RA and the second satellite 1413 providing the third satellite communication cell 1407 in the RA, the paging request message indicating to perform paging in cells within coverage of each satellite. In an embodiment, the first satellite 1411 and the second satellite 1413 may attempt paging to a UE in their coverage. For example, when a UE 1401 is located in the fourth satellite communication cell 1409, the UE may be paged via the second satellite 1413 and thus, the UE 1401 may be switched to a connected state.

In an embodiment, the MMS 1425 may start a timer while transmitting a paging request message to satellites. If the UE 1401 is not located within coverage of the first satellite 1411 and the second satellite 1413, and thus, the paging described with reference to FIG. 14 fails, the MMS 1425 may attempt paging in a wider range. That is, when the timer is expired before paging succeeds or when a paging failure message is received before the timer is expired, a paging procedure with next-high priority may be performed. The paging procedure with next-high priority will now be described with reference to FIGS. 15 to 16.

Figure 15:
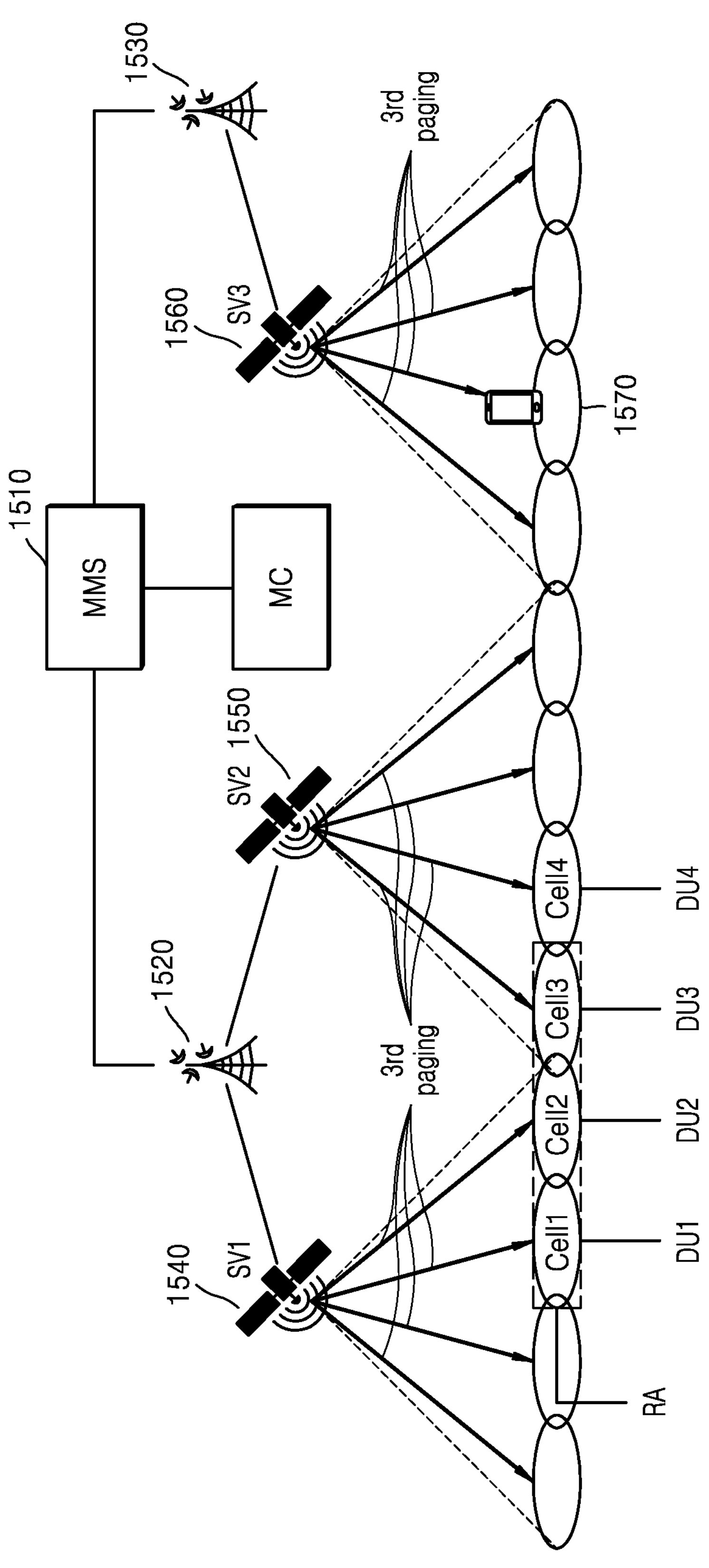
FIG. 15 illustrates a method of managing mobility of a UE by using a plurality of satellites in a paging failure according to an embodiment of the present disclosure.

FIG. 15 illustrates a method of managing mobility of a UE by using a plurality of satellites in a paging failure according to an embodiment of the present disclosure.

Referring to FIG. 15, an MMS 1510 may be connected to a first ground station 1520 and a second ground station 1530 by wire or wirelessly, the first ground station 1520 may be connected to a first satellite 1540 and a second satellite 1550 by wirelessly, and the second ground station 1530 may be connected to a third satellite 1560 by wirelessly.

In an embodiment, when a UE does not exist even in coverage of satellites providing at least some of satellite communication cells included in an RA, the plurality of satellites may transmit a paging message to their satellite communication cells. That is, when paging fails because the UE does not exist in the coverage of the satellites providing at least some of satellite communication cells included in the RA, paging may be performed in a range wider than the coverage of the satellites providing at least some of satellite communication cells included in the RA.

In an embodiment, the MMS 1510 may transmit a paging request message to a BS connected to each satellite, via the satellite 1560 in addition to the satellites 1540 and 1550 providing at least some of satellite communication cells included in the RA, the paging request message indicating to perform paging to the UE. For example, the RA may include a first satellite communication cell (Cell 1), a second satellite communication cell (Cell 2), and a third satellite communication cell (Cell 3), and the first satellite communication cell (Cell 1) and the second satellite communication cell (Cell 2) may be provided by the first satellite 1540 and the third satellite communication cell (Cell 3) may be provided by the second satellite 1550. In an embodiment, the MMS 1510 may not receive a paging response, in response to the paging request message transmitted to BSs connected to the first satellite 1540 and the second satellite 1550 which provide at least some of the first satellite communication cell (Cell 1), the second satellite communication cell (Cell 2), and the third satellite communication cell (Cell 3). Accordingly, the MMS 1510 may transmit a paging request message via satellites of a wider range. For example, the MMS 1510 may transmit the paging request message to BSs connected to the first satellite 1540, the second satellite 1550, and the third satellite 1560. That is, the MMS 1510 may perform paging on the UE by gradually broadening a range of satellite communication cells until paging succeeds. Accordingly, the UE located in a satellite communication cell 1570 of the third satellite 1560 may be paged to switch to a connected state.

Figure 16:
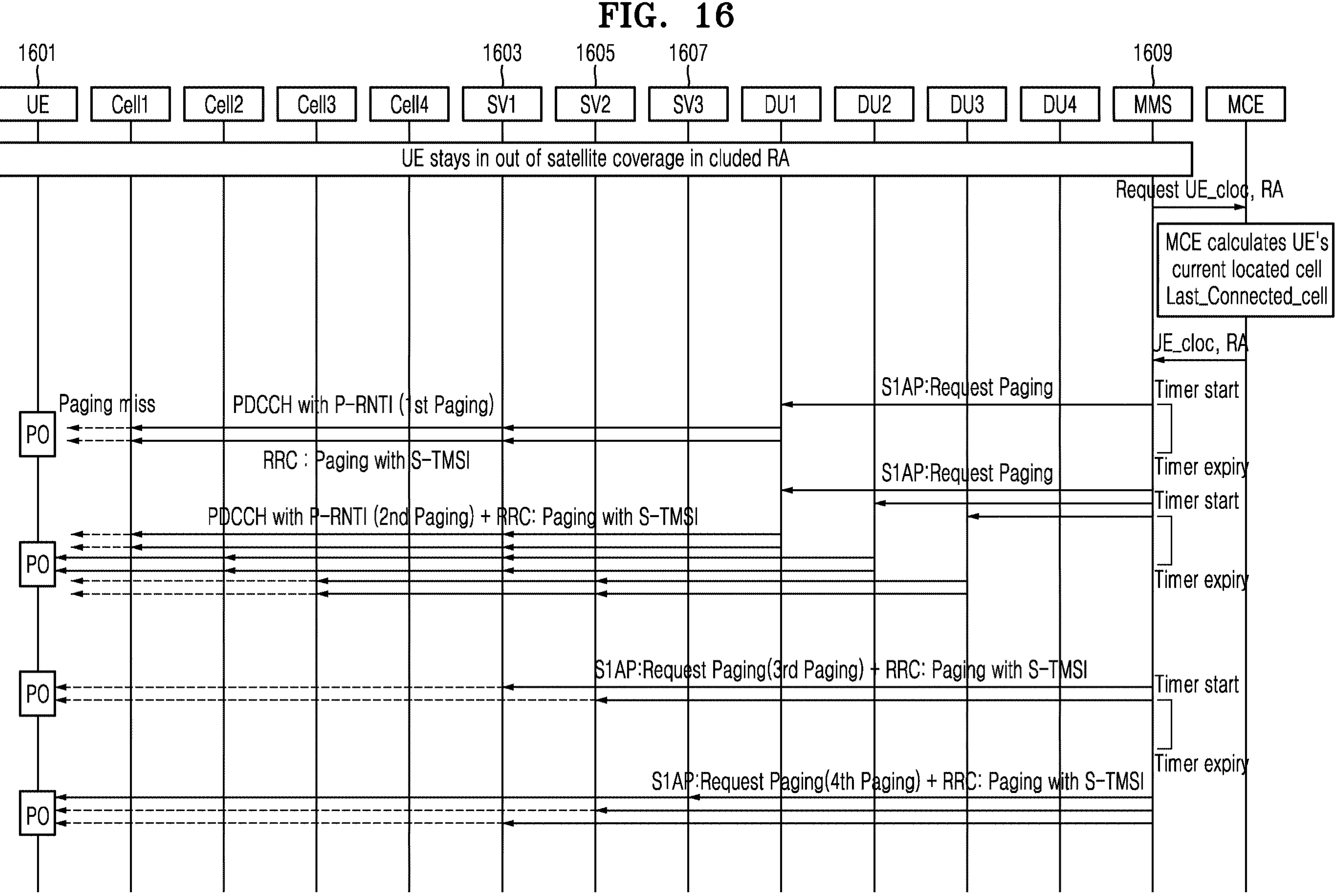
FIG. 16 illustrates a flowchart of a method of managing mobility of a UE by using a plurality of satellites in a paging failure according to an embodiment of the present disclosure.

FIG. 16 illustrates a flowchart of a method of managing mobility of a UE by using a plurality of satellites in a paging failure according to an embodiment of the present disclosure.

Referring to FIG. 16, the UE may not be located in an RA region including a cell (Pred_Cell) corresponding to a cell to which the UE is last-connected to the cell to which the UE was last-connected and may not be located within satellite coverage including an RA. Therefore, the paging performed on Pred_Cell, cells in an RA, and coverage of a satellite including at least some of the RA described above with reference to FIGS. 10, 12, and 12 may fail. In an embodiment, an MMS 1609 does not receive a paging response until an expiry of a timer or receives a paging failure message before an expiry of the timer, the timer being started when a paging request message was transmitted to Pred_Cell, accordingly, the MMS 1609 does not receive a paging response before an expiry of a timer or receives a paging failure message before the expiry of the timer, the timer being started when a paging request message is transmitted to cells included in the RA, or, the MMS 1609 may not receive a paging response before an expiry of a timer or may receive a paging failure message before the expiry of the timer, the timer being started when a paging message was transmitted to cells included in satellite coverage of satellites providing at least a part of the RA. In this case, the MMS 1609 may perform paging by gradually broadening a range of satellite communication cells until paging succeeds.

In an embodiment, the MMS 1609 may transmit a paging request message requesting paging via a plurality of satellites 1603, 1605, and 1607. The plurality of satellites 1603, 1605, and 1607 may be satellites providing at least a part of the RA, satellites neighboring the satellites providing at least the part of the RA, random satellites, or a combination thereof. For example, a UE 1601 may be located within coverage of the third satellite 1607. Accordingly, the UE 1601 may be paged, based on the paging request message being transmitted from the MMS 1609 to the third satellite 1607. According to an embodiment, even when a location of a UE is significantly changed, the location of the UE may be detected via a plurality of satellites, such that a mobile communication service may be provided to the UE anywhere.

Figure 17:
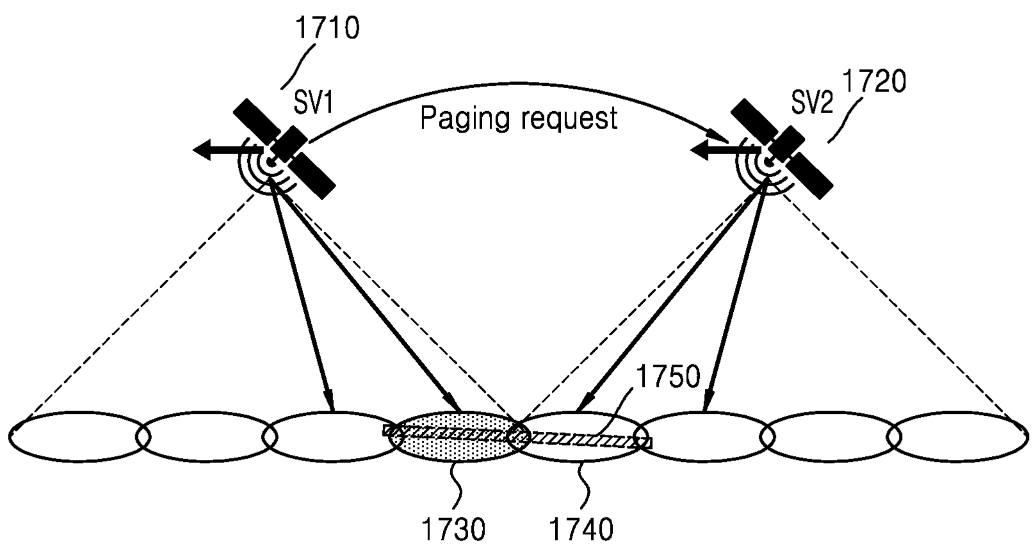
FIG. 17 illustrates a method of managing mobility of a UE via communication between satellites according to an embodiment of the present disclosure.

FIG. 17 illustrates a method of managing mobility of a UE via communication between satellites according to an embodiment of the present disclosure.

Referring to FIG. 17, paging re-attempt may be performed via an interface between a first satellite 1710 and a second satellite 1720. In an embodiment, when a satellite is enabled to function as a BS, for example, when the satellite is a regenerative satellite, signaling of paging may be simplified via transmission of a paging request message between satellites.

In an embodiment, a satellite communication cell corresponding to a ground location of a UE when the UE is last-connected to the satellite communication cell to which the UE was last-connected may be a second satellite communication cell 1730, based on the satellite communication cell to which the UE was last-connected and a relative movement of at least one satellite with respect to the ground. Accordingly, although the first satellite 1710 has received a paging request message from a network entity (e.g.: AMF, MME) managing mobility and thus transmitted a paging request to the second satellite communication cell 1730, paging to the UE may fail as the UE is not located in the first satellite communication cell 1730. The first satellite 1710 may receive information about a location of the UE from the network entity managing mobility. In an embodiment, the information about the location of the UE may include a satellite communication cell corresponding to a ground location of the UE when the UE is last-connected to the satellite communication cell to which the UE was last-connected, an RA determined accordingly, or the like. For example, the first satellite 1710 may obtain information indicating that the satellite communication cell corresponding to the ground location of the UE when the UE is last-connected to the satellite communication cell to which the UE was last-connected is the first satellite communication cell 1730, and the RA of the UE is a first RA 1750. Accordingly, the first satellite 1710 may transmit a paging message to the first satellite communication cell 1730 to page the UE if the UE is located in the first satellite communication cell 1730, based on the plurality of pieces of received information. However, when paging fails as the UE is not located in the first satellite communication cell 1730, paging may be performed in an RA range corresponding to a wider range. Accordingly, a paging relay message may be transmitted to a second satellite 1720 providing a part of the first RA 1750. In an embodiment, the paging relay message may include a message requesting, via an interface between satellites, another satellite for paging re-attempt after first paging attempting paging based on a plurality of pieces of information received from the network entity managing mobility fails.

According to an embodiment, satellite link performance may be low in the satellite network and thus communication performance with respect to the core network may also be low, however, whether to perform paging re-attempt is determined via the interface between satellites and the paging re-attempt is performed, such that signaling with respect to the core network may be decreased to enable efficient communication and a paging relay time may also be decreased.

FIG. 18 illustrates a flowchart of a method of managing mobility of a UE via communication between satellites according to an embodiment of the present disclosure.

Referring to FIG. 18, the UE may not be located in a cell (Pred_Cell) corresponding to a cell to which the UE is last-connected to the cell to which the UE was last-connected but may be located within an RA region including Pred_Cell. In an embodiment, a first satellite SV 1 may include, as a regenerative satellite, a first BS DU1. The first satellite SV 1 may include a second BS DU2.

In an embodiment, an MMS that may correspond to an MME in the LTE system or an AMF in the NR system may request an MCE for information about a cell in which the UE is currently located and information about an RA, or the like. Accordingly, the MCE may identify a satellite communication cell (Pred_Cell) corresponding to a ground location of the UE when the UE is last-connected to the satellite communication cell to which the UE was last-connected, and the RA including Pred_Cell, based on the cell to which the UE was last-connected, a movement of at least one satellite, the Earth's rotation, or the like. Accordingly, the MCE may transmit, to the MMS, the information about Pred_Cell and the RA. The MMS may transmit a paging request message to a BS (DU1) managing Pred_Cell, based on the plurality of pieces of information received from the MCE, and may start a first timer. In an embodiment, the first timer may be a timer for which second paging is considered. That is, when paging in Pred_Cell fails, a timer value for which a situation is considered may be determined as a first timer, the situation where paging re-attempt is performed via an interface between regenerative satellites.

In an embodiment, the first BS (DU1) may attempt paging with respect to the UE when the UE is located within the first cell (Cell 1) corresponding to Pred_Cell, based on the paging request message received from the MMS. However, paging may fail as the UE is not located in the first cell (Cell 1). Accordingly, the first BS (DU1) may transmit a paging request relay message for paging-reattempt to the second BS2 (DU2) and the third BS (D3E). Also, the first BS (DU1) may start a second timer while transmitting the paging request relay message. For example, the second timer may be T3413 but the present disclosure is not limited thereto.

In an embodiment, the first BS (DU1), the second BS2 (DU2) and the third BS (D3E) may attempt paging with respect to the UE respectively via the first cell (Cell 1), a second cell (Cell 2), and a third cell (Cell 3). As the UE is located in the second cell (Cell 2), paging by the second BS2 (DU2) may succeed. Accordingly, the UE may perform a random access procedure, and the second BS2 (DU2) may transmit a paging response to the MIMS. For example, the paging response may include an initial UE message with a service request. As the MMS receives the paging response before an expiry of the first timer, a paging procedure may be successfully performed.

According to an embodiment, when paging fails, the core network may adjust whether to perform paging re-attempt, but, in a case of a regenerative satellite, the satellite processes whether to perform paging re-attempt, such that the number of times of signaling with respect to the core network and a paging delay time may be decreased. In an embodiment, paging re-attempt via an interface between satellites described with reference to FIG. 17 or 18 may also be applied to a paging re-attempt method described with reference to FIGS. 11 to 16.

FIGS. 19A and 19B illustrate a method of managing mobility of a UE via communication with a core network or communication between satellites according to an embodiment of the present disclosure.

Referring to FIGS. 19A and 19B, a difference between a case of using the core network and a case of not using the core network is illustrated. In an embodiment, after a satellite transmits a paging message to a UE, the satellite may detect a failure of paging with respect to the UE. Accordingly, ① the satellite may transmit, to a BS, a paging failure indicator indicating the failure of paging with respect to the UE. ② The BS may transmit, to the core network, the paging failure indicator received from the satellite. ③ Accordingly, the core network may transmit, to the BS, a paging re-attempt message indicating paging to the UE via a new cell. ④ The BS may configure and transmit a new paging message to the satellite, based on the received paging re-attempt message. ⑤ The satellite may attempt paging to the UE via its satellite communication cell, based on the paging message. That is, according to an embodiment, a delay time consumed to perform paging via signaling with respect to the core network may be increased. Accordingly, a paging re-attempt method via an interface between satellites, not via the core network, will now be described.

In an embodiment, after the failure of paging, the satellite may perform paging re-attempt on the UE in a satellite end, not via the core network. According to an embodiment, in a case of paging re-attempt processible by the satellite end, the satellite performs paging re-attempt without transmitting or receiving a signal to or from the BS and the core network, such that a delay time consumed to perform paging re-attempt may be decreased.

Figure 20:
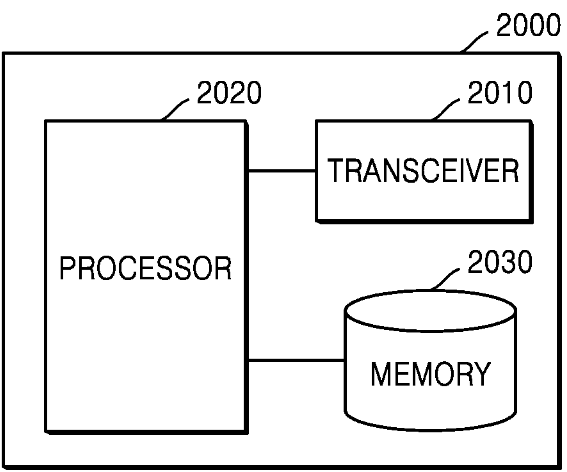
FIG. 20 illustrates a block diagram of a configuration of a satellite communication cell management apparatus according to an embodiment of the present disclosure.

FIG. 20 illustrates a block diagram of a configuration of a satellite communication cell management apparatus according to an embodiment of the present disclosure.

Referring to FIG. 20, a satellite communication cell management apparatus 2000 may include a transceiver 2010, a processor 2020, and a memory 2030. According to the afore-described communication method of the satellite communication cell management apparatus 2000, the transceiver 2010, the processor 2020, and the memory 2030 of the satellite communication cell management apparatus 2000 may operate. However, elements of the satellite communication cell management apparatus are not limited to the example above. For example, the satellite communication cell management apparatus 2000 may include more elements than the aforementioned elements or may include fewer elements than the aforementioned elements. Also, the transceiver 2010, the processor 2020, and the memory 2030 may be implemented as one chip. Also, the processor 2020 may include one or more processors.

The transceiver 2010 may provide an interface for communicating with other nodes in a network. That is, the transceiver 2010 converts a bit string into a physical signal, the bit string being transmitted from the satellite communication cell management apparatus to another apparatus, and converts a physical signal into a bit string, the physical signal being received from the other apparatus. That is, the transceiver 2010 may transmit and receive signals. Accordingly, the transceiver 2010 may be referred to as a modem, a transmitter, a receiver, a communication unit, or a communication module. Here, the transceiver 2010 may allow the satellite communication cell management apparatus to communicate with other apparatuses or system via a backhaul link (e.g., a wired backhaul or a wireless backhaul) or other connection scheme or network. For example, the satellite communication cell management apparatus 2000 may include an MME or an AMF.

The processor 2020 may control overall operations of the satellite communication cell management apparatus 2000. For example, the processor 2020 may transmit or receive signals via the transceiver 2010. Also, the processor 2020 may record and read data on or from the memory 2030. To this end, the processor 2020 may include at least one processor. The processor 2020 may control the satellite communication cell management apparatus 2000 to perform operations according to the various embodiments. For example, the processor 2020 may control the elements of the satellite communication cell management apparatus 2000 to perform direct communication according to embodiments of the present disclosure.

The memory 2030 may store basic programs, application programs, and data such as configuration information, etc. for operations of the satellite communication cell management apparatus 2000. The memory 2030 may be configured as a volatile memory, a non-volatile memory, or a combination of a volatile memory and a non-volatile memory. The memory 2030 may provide stored data, in response to a request by the processor 2020.

Figure 21:
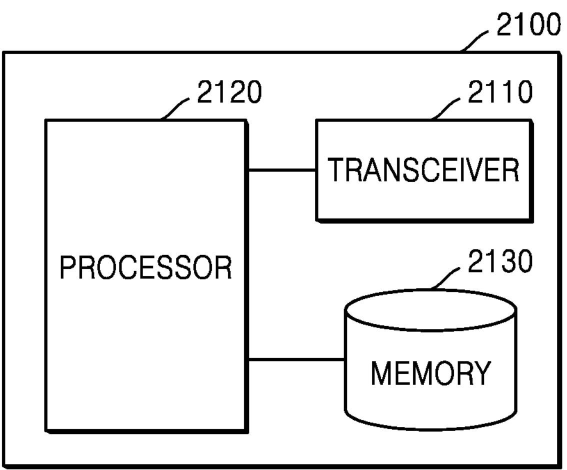
FIG. 21 illustrates a block diagram of a configuration of a UE according to an embodiment of the present disclosure.

FIG. 21 illustrates a block diagram of a configuration of a UE according to an embodiment of the present disclosure.

Referring to FIG. 21, a UE 2100 may include a transceiver 2110, a processor 2120, and a memory 2130. According to the afore-described communication method of the UE, the transceiver 2110, the processor 2120, and the memory 2130 of the UE may operate. However, elements of the UE are not limited to the example above. For example, the UE 2100 may include more elements than the aforementioned elements or may include fewer elements than the aforementioned elements. Also, the transceiver 2110, the processor 2120, and the memory 2130 may be implemented as one chip. Also, the processor 2120 may include one or more processors.

A transmitter and a receiver of the UE 2100 may be collectively referred to as the transceiver 2110, and the transceiver 2110 may transmit or receive a signal to or from a satellite, a network entity, a BS, or another UE. The signal transmitted to or received from the network entity, the BS, or the other UE may include control information and data. To this end, the transceiver 2110 may include a RF transmitter for up-converting a frequency of and amplifying signals to be transmitted, and an RF receiver for low-noise-amplifying and down-converting a frequency of received signals. However, this is merely an example of the transceiver 2110, and thus elements of the transceiver 2110 are not limited to the RF transmitter and the RF receiver. Also, the transceiver 2110 may receive a signal via a wireless channel and output the signal to the processor 2120, and may transmit a signal output from the processor 2120, via a wireless channel.

The processor 2120 may control a series of processes to allow the UE to operate according to the aforementioned embodiments of the present disclosure. For example, the processor 2120 may receive a control signal and a data signal by using the transceiver 2110, and may process the received control signal and the received data signal. Also, the processor 2120 may transmit the processed control signal and the processed data signal by using the transceiver 2110. Also, the processor 2120 may control elements of the UE to receive a PDSCH by receiving downlink control information (DCI).

The memory 2130 may store programs and data necessary for operations of the UE 2100. Also, the memory 2130 may store control information or data which are included in a signal obtained by the UE. The memory 2130 may be implemented as a storage medium including a read only memory (ROM), a random access memory (RAM), a hard disk, a compact disc (CD)-ROM, a digital versatile disc (DVD), or the like, or any combination thereof. Alternatively, the memory 2130 may not be separately arranged but may be included in the processor 2120.

Figure 22:
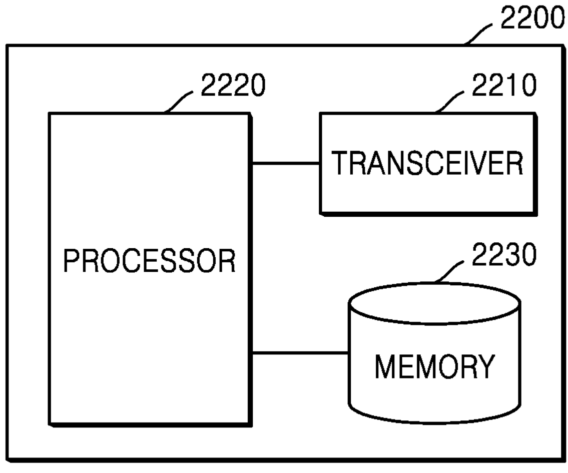
FIG. 22 illustrates a block diagram of a configuration of a BS according to an embodiment of the present disclosure.

FIG. 22 illustrates a block diagram of a configuration of a BS according to an embodiment of the present disclosure.

Referring to FIG. 22, a BS 2200 may include a transceiver 2210, a memory 2230, and a processor 2220. According to the afore-described communication method of the BS, the transceiver 2210, the processor 2220, and the memory 2230 of the BS may operate. However, elements of the BS are not limited to the example above. For example, the BS may include more elements than the aforementioned elements or may include fewer elements than the aforementioned elements. Also, the transceiver 2210, the processor 2220, and the memory 2230 may be implemented as one chip. Also, the processor 2220 may include one or more processors.

A transmitter and a receiver of the BS 2200 may be collectively referred to as the transceiver 2210, and the transceiver 2210 may transmit or receive a signal to or from another BS, a UE, or a network entity. The signal transmitted to or received from a satellite, the other BS, the UE, or the network entity may include control information and data. To this end, the transceiver 2210 may include a RF transmitter for up-converting a frequency of and amplifying signals to be transmitted, and an RF receiver for low-noise-amplifying and down-converting a frequency of received signals. However, this is merely an example of the transceiver 2210, and thus elements of the transceiver 2210 are not limited to the RF transmitter and the RF receiver. Also, the transceiver 2210 may receive a signal via a wireless channel and output the signal to the processor 2220, and may transmit a signal output from the processor 2220, via a wireless channel.

The memory 2230 may store programs and data necessary for operations of the BS 2200. Also, the memory 2230 may store control information or data which are included in a signal obtained by the BS. The memory 2230 may be implemented as a storage medium including a ROM, a RAM, a hard disk, a CD-ROM, a DVD, or the like, or any combination thereof. Alternatively, the memory 2230 may not be separately arranged but may be included in the processor 2220.

The processor 2220 may control a series of processes to allow the BS to operate according to the aforementioned embodiments of the present disclosure. For example, the processor 2220 may receive a control signal and a data signal by using the transceiver 2210, and may process the received control signal and the received data signal. Also, the processor 2220 may transmit the processed control signal and the processed data signal by using the transceiver 2210. Also, the processor 2220 may configure DCI including allocation information for a PDSCH, and may control each element of the BS to transmit the DCI.

Figure 23:
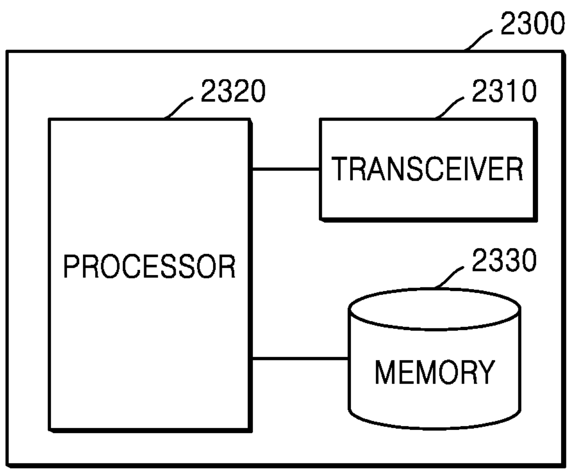
FIG. 23 illustrates a block diagram of a configuration of a satellite according to an embodiment of the present disclosure.

FIG. 23 illustrates a block diagram of a configuration of a satellite according to an embodiment of the present disclosure.

Referring to FIG. 23, a satellite 2300 may include a transceiver 2310, a processor 2320, and a memory 2330. However, not every element shown in FIG. 23 is an essential element of the satellite 2300. The satellite 2300 may be embodied with more elements than the shown elements of FIG. 23 or may be embodied with fewer elements than the shown elements of FIG. 23.

The transceiver 2310, the memory 2330, and the processor 2320 may each be provided in plural. That is, the transceiver 2310 may be configured of a transceiver for transmission and reception with respect to a UE, and a transceiver for transmission and reception with respect to a BS. According to the afore-described communication method of the satellite, the transceiver 2310 of the satellite 2300, the memory 2330 of the satellite 2300, and the processor 2320 of the satellite 2300 may operate.

The transceiver 2310 may transmit or receive a signal to or from a UE and a BS. The signal transmitted to or received from the UE and the BS may include control information and data. To this end, the transceiver 2310 may include a RF transmitter for up-converting a frequency of and amplifying signals to be transmitted, and an RF receiver for low-noise-amplifying and down-converting a frequency of received signals. Also, the transceiver 2310 may receive a signal via a wireless channel and output the signal to the processor 2320, and may transmit a signal output from the processor 2320, via a wireless channel. However, this is merely an example of the transceiver 2310, and thus elements of the transceiver 2310 are not limited to the RF transmitter and the RF receiver.

The processor 2320 of the satellite may include a compensator or a pre-compensator to adjust frequency offset or Doppler shift, and may include an entity to track a location based on a global positioning system (GPS). Also, the processor 2320 of the satellite may include a frequency shift function for shifting a center frequency of a received signal. The processor 2320 may control a series of processes to allow the satellite to operate according to the aforementioned embodiments of the present disclosure. For example, when the processor 2320 of the satellite 2300 performs paging on a UE whose last-connected satellite communication cell is a first satellite communication cell, the processor 2320 may transmit a paging message to the UE, based on a result of transmitting, by a network entity, a paging message to a second satellite communication cell corresponding to a location of the UE on the ground when the UE is last-connected to the first satellite communication cell, based on the first satellite communication cell and a relative movement of at least one satellite with respect to and the ground.

The memory 2330 may store programs and data necessary for operations of the satellite 2300. Also, the memory 2330 may store control information or data which are included in a signal obtained by the satellite 2300. The memory 2330 may be implemented as a storage medium including a ROM, a RAM, a hard disk, a CD-ROM, a DVD, or the like, or any combination thereof. Alternatively, the memory 2330 may not be separately arranged but may be included in the processor 2320.

Figure 24:
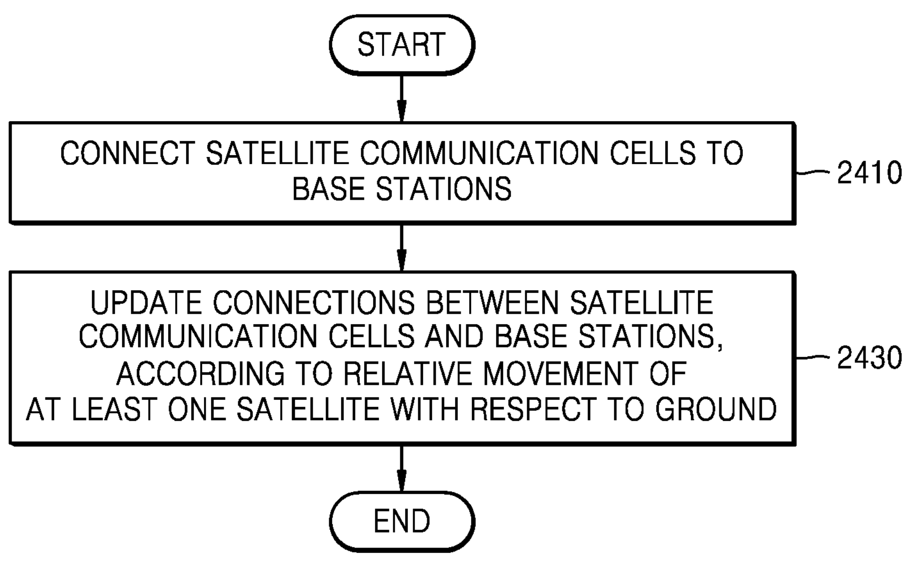
FIG. 24 illustrates a flowchart of an operation method of a satellite communication cell management apparatus according to an embodiment of the present disclosure.

FIG. 24 illustrates a flowchart of an operation method of a satellite communication cell management apparatus according to an embodiment of the present disclosure.

Referring to FIG. 24, in operation 2410, the satellite communication cell management apparatus may connect satellite communication cells to BSs. For example, the satellite communication cell management apparatus may connect the satellite communication cells in a management area of a first ground station (e.g.: BS center, DU center) to the BSs managed by the first ground station.

In operation 2430, the satellite communication cell management apparatus may update connections between the satellite communication cells and the BSs, according to a relative movement of at least one satellite with respect to the ground. For example, when a first satellite communication cell exits from the management area of the first ground station and a second satellite communication cell enters the management area of the first ground station, according to the relative movement of at least one satellite with respect to the ground, a connection between the first satellite communication cell and the first ground station connected to the first satellite communication cell may be released, and the second satellite communication cell and the first ground station may be connected. Also, satellite communication cells still existing in the management area of the first ground station, according to the relative movement of at least one satellite with respect to the ground, may maintain their previous connections to the BSs.

In an embodiment, some of satellite communication cells may constitute an RA. The satellite communication cells constituting the RA may be disposed to be arranged in a band shape extending in a relative movement direction of a satellite with respect to the ground.

In an embodiment, the satellite communication cell management apparatus may identify necessity for paging to a UE for which last-connected satellite communication cell is the first satellite communication cell. Accordingly, based on the first satellite communication cell and the relative movement direction of at least one satellite with respect to the ground, a paging request message may be transmitted to a BS that manages the second satellite communication cell corresponding to a ground location of the UE when the UE was last-connected to the first satellite communication cell. Accordingly, the BS that manages the second satellite communication cell may configure and transmit a paging message to the second satellite communication cell.

In an embodiment, when the satellite communication cell management apparatus performs paging on the UE for which last-connected satellite communication cell is the first satellite communication cell, as paging fails with respect to the second satellite communication cell corresponding to the ground location of the UE when the UE was last-connected to the first satellite communication cell, based on the first satellite communication cell and the relative movement of at least one satellite with respect to the ground, the satellite communication cell management apparatus may transmit a paging message to a plurality of satellite communication cells.

In an embodiment, the plurality of satellite communication cells may include at least some of satellite communication cells including the second satellite communication cell and constituting the RA, at least some of satellite communication cells within satellite coverage of satellites providing at least a part of the RA, or at least some of satellite communication cells within satellite coverage of a plurality of satellites.

In an embodiment, the satellite communication cell management apparatus may attempt paging while gradually broadening a range of satellite communication cells until paging succeeds.

In an embodiment, when the satellite communication cell management apparatus performs paging on the UE for which last-connected satellite communication cell is the first satellite communication cell, after paging fails with respect to the second satellite communication cell corresponding to the ground location of the UE when the UE was last-connected to the first satellite communication cell, the satellite communication cell management apparatus may receive a paging response message from a third satellite communication cell. For example, the paging response message may include a service request message, an initial message of the UE, or the like. Here, the paging response message may be a message that is transmitted as a result of succeeding in paging to the UE by transmitting, by a first satellite providing the second satellite communication cell, a paging relay message to a second satellite providing the third satellite communication cell.

Figure 25:
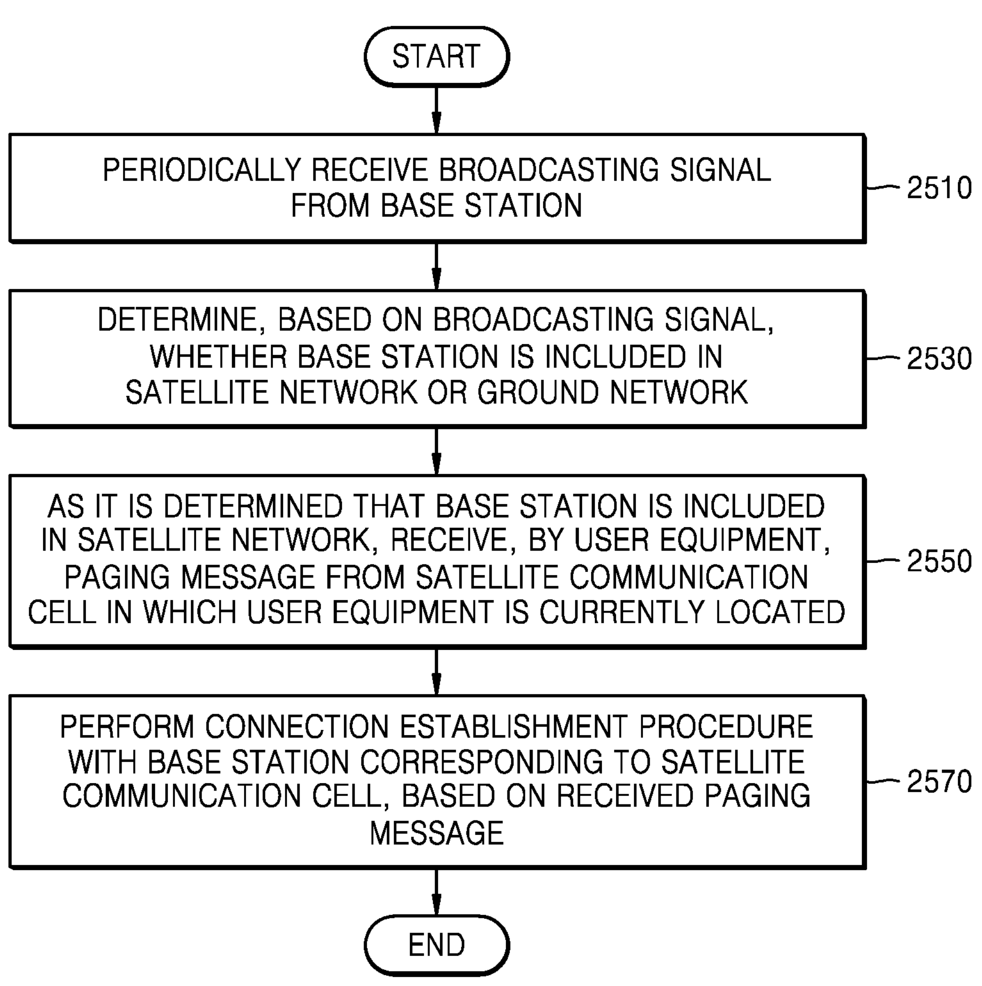
FIG. 25 illustrates a flowchart of an operating method of a UE according to an embodiment of the present disclosure.

FIG. 25 illustrates a flowchart of an operating method of a UE according to an embodiment of the present disclosure.

Referring to FIG. 25, in operation 2510, the UE may periodically receive a broadcasting signal from a BS.

In an embodiment, direct communication between a satellite and the UE may support a communication service designed to complement a coverage limit of a ground network. For example, by implementing, in a user terminal, a function of direction communication between a satellite and a UE, transmission and reception of an emergency rescue and/or disaster signal of a user outside ground network communication coverage may be enabled, a mobile communication service for a user in an area such as ships and/or airplanes for which ground network communication is not available may be provided, locations of ships, cargo trucks, and/or drones may be tracked and controlled in real time without border limit, and as a satellite communication function is supported to a BS and thus functions as a backhaul of the BS, the satellite communication may be used to perform a backhaul function when the BS is physically remote.

In an embodiment, that the UE transmits or receives a signal to or from the BS in satellite communication may mean that the signal is delivered via the satellite. That is, in a DL, the satellite may serve to receive a signal transmitted from the BS to the satellite and to deliver the signal to the UE, and in a UL, the satellite may serve to receive a signal transmitted from the UE to the satellite and to deliver the signal to the BS. In this case, the satellite may receive a signal, may perform frequency shifting on the signal without a change and may transmit the signal, or may perform signal processing such as decoding and re-encoding and then may transmit the signal. Accordingly, the UE may need to identify whether the BS is included in a satellite network or is included in a ground network. That is, when the UE has a signal to be transmitted to the BS, the UE may need to identify whether to transmit the signal via a satellite or to directly transmit the signal to a BS corresponding to the ground network.

In operation 2530, the UE may determine, based on the broadcasting signal, whether the BS is included in a satellite network or a ground network. In an embodiment, the UE may determine, based on the broadcasting signal, whether the BS transmitting the broadcasting signal to the UE is included in the satellite network or the ground network. For example, when the BS transmits the broadcasting signal to the satellite, and the satellite includes its identifier in the broadcasting signal and transmits the broadcasting signal to the UE, the UE that receives the broadcasting signal may determine that a BS corresponding thereto is the satellite network.

In an embodiment, the broadcast signal may include an SSB, a PSS, an SSS, an MIB of a PBCH, an SIB, or the like, but the present disclosure is not limited thereto and may include a signal being broadcast.

In an embodiment, the UE may determine whether the BS is the satellite network or the ground network, based on an identifier for identifying the satellite network or the ground network, the identifier being included in the broadcast signal. For example, the identifier may include information including cell information such as a physical cell identification (PID), a PSS/SSS sequence, a public land mobile network ID (PLMN ID), or the like, but the present disclosure is not limited thereto and may include a new identifier for identifying the satellite network or the ground network.

In an embodiment, when the UE determines that the BS is the satellite network, an RA corresponding to the satellite network may be applied thereto, and when the UE determines that the BS is the ground network, an RA corresponding to the ground network may be applied thereto.

In operation 2550, as the UE determines that the BS is included in the satellite network, the UE may receive a paging message from a satellite communication cell in which the UE is currently located. In an embodiment, the satellite communication cell in which the UE is currently located may be different from a satellite communication cell to which the UE was last-connected. For example, when the satellite communication cell to which the UE was last-connected is the first satellite communication cell, an entity of a core network may estimate a satellite communication cell in which the UE may be currently located, based on the first satellite communication cell, the Earth's rotation, a relative movement of at least one satellite with respect to the ground, or the like. In an embodiment, the entity of the core network may attempt paging to the UE by transmitting a paging request message to the estimated satellite communication cell, and when it is failed, the entity of the core network may attempt paging while gradually broadening a range of satellite communication cells to satellite communication cells neighboring the estimated satellite communication cell, cells included in an RA corresponding to the satellite network, at least some of satellite communication cells within satellite coverage of satellites providing at least a part of the RA, satellite communication cells within satellite coverages of a plurality of satellites, or the like. Accordingly, a BS managing a cell in which the UE is currently located may configure a paging message, based on the paging request message received from the entity of the core network, and may transmit the configured paging message to the UE via the a satellite providing the cell in which the UE is currently located. Therefore, the UE may receive the paging message.

In operation 2570, the UE may perform a connection establishment procedure with the BS corresponding to the satellite communication cell, based on the received paging message. Accordingly, the UE may be switched to a connected state. For example, the UE may be switched from an RRC idle state to an RRC connected state.

In an embodiment, the satellite communication cell to which the UE was last-connected may be the first satellite communication cell, a satellite communication cell corresponding to the BS performing the connection establishment procedure may be the second satellite communication cell, and the second satellite communication cell may be a satellite communication cell corresponding to the ground location of the UE when the UE was last-connected to the first satellite communication cell.

In an embodiment, the satellite communication cell to which the UE was last-connected may be the first satellite communication cell, a satellite communication cell corresponding to the ground location of the UE when the UE was last-connected to the first satellite communication cell may be the second satellite communication cell, and a satellite communication cell corresponding to the BS performing the connection establishment procedure may be the third satellite communication cell, and as the UE fails to receive a paging message from the second satellite communication cell, the UE may receive a paging message from the third satellite communication cell. In this case, the third satellite communication cell may be a satellite communication cell among a satellite communication cell constituting an RA including the second satellite communication cell, a satellite communication cell within satellite coverage of satellites proving at least a part of the RA, or a satellite communication cell within satellite coverages of a plurality of satellites.

In an embodiment, the satellite communication cell to which the UE was last-connected may be the first satellite communication cell, a satellite communication cell corresponding to the ground location of the UE when the UE was last-connected to the first satellite communication cell may be the second satellite communication cell, and a satellite communication cell corresponding to the BS performing the connection establishment procedure may be the third satellite communication cell, and the third satellite communication cell may be a satellite communication cell in which, as the UE having failed to receive a paging message from the second satellite communication cell, the network entity attempts and then succeeds in paging to the UE while gradually broadening a range of satellite communication cells until the paging succeeds.

In an embodiment, the satellite communication cell to which the UE was last-connected may be the first satellite communication cell, a satellite communication cell corresponding to the ground location of the UE when the UE was last-connected to the first satellite communication cell may be the second satellite communication cell, and a satellite communication cell corresponding to the BS performing the connection establishment procedure may be the third satellite communication cell, and the third satellite communication cell may be a satellite communication cell in which, as the UE having failed to receive a paging message from the second satellite communication cell, the first satellite providing the second satellite communication cell performs a paging procedure on the UE by transmitting a paging relay message to the second satellite providing the third satellite communication cell.

Figure 26:
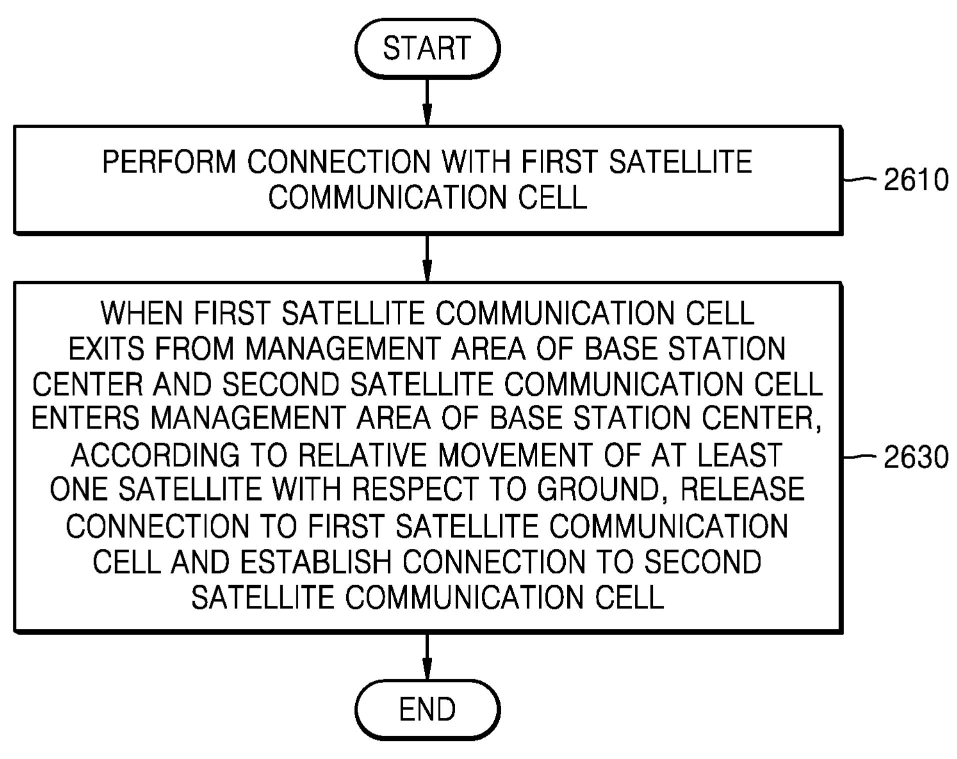
FIG. 26 illustrates a flowchart of an operating method of a BS according to an embodiment of the present disclosure.

FIG. 26 illustrates a flowchart of an operating method of a BS according to an embodiment of the present disclosure.

Referring to FIG. 26, in operation 2610, the BS may perform a connection with a first satellite communication cell. In an embodiment, the BS (e.g.: a DU) may have a one-to-one relation with a cell. Therefore, until a connection between the BS and a satellite is released according to a relative movement of at least one satellite with respect to the ground, the BS may maintain a one-to-one relation with a satellite communication cell.

In operation 2630, when the first satellite communication cell exits from a management area of a BS center and a second satellite communication cell enters the management area of the BS center, according to the relative movement of at least one satellite with respect to the ground, the BS may release a connection to the first satellite communication cell and may establish a connection to the second satellite communication cell. In an embodiment, when a previously-connected satellite communication cell exits from the management area of the BS, according to the relative movement of at least one satellite with respect to the ground, a connection to the previously-connected satellite communication cell may be released. In this case, the BS may establish a connection to other satellite communication cell that newly enters the management area of the BS. Here, the other satellite communication cell that newly enters the management area of the BS may be a satellite communication cell that was connected to other BS but its connection to the other BS is released due to a movement of a satellite. However, even in this case, satellite communication cells excluding the satellite communication cell exiting from the management area of the BS and the satellite communication cell entering the management area of the BS may continuously maintain their connections to BSs. In an embodiment, the management area of the BS center may correspond to a management area of a ground station that manages a plurality of BSs (e.g.: DUs).

In an embodiment, when the BS performs paging on the UE for which last-connected satellite communication cell is the third satellite communication cell, as a result of determining, by the network entity, that the BS is a BS corresponding to the fourth satellite communication cell corresponding to a ground location of the UE when the UE was last-connected to the third satellite communication cell, based on the third satellite communication cell and a relative movement of at least one satellite with respect to the ground, the BS may receive a paging request message from the network entity, and based on the received paging request message, may configure and transmit a paging message to the UE.

In an embodiment, when the BS performs paging on the UE for which last-connected satellite communication cell is the third satellite communication cell, as a result of paging with respect to the fourth satellite communication cell fails, the fourth satellite communication cell corresponding to the ground location of the UE when the UE was last-connected to the third satellite communication cell, based on the third satellite communication cell and the relative movement of at least one satellite with respect to the ground, the BS may receive the paging request message and thus may transmit the paging message to the UE. Here, the paging request message may include one of a paging request message received from a core network and a paging relay message received from other BS or other satellite.

Figure 27:
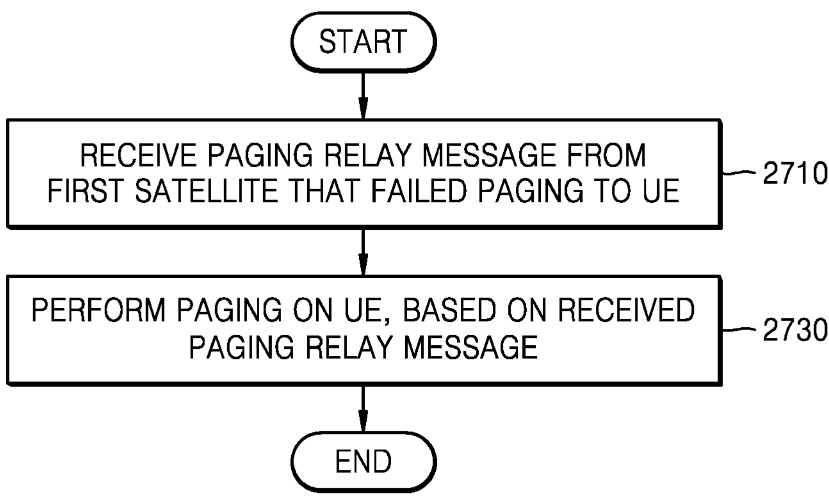
FIG. 27 illustrates a flowchart of an operating method of a satellite according to an embodiment of the present disclosure.

FIG. 27 illustrates a flowchart of an operating method of a satellite according to an embodiment of the present disclosure.

Referring to FIG. 27, in operation 2710, the satellite may receive a paging relay message from a first satellite that failed paging to a UE.

In an embodiment, when the satellite performs paging on the UE for which last-connected satellite communication cell is a first satellite communication cell, the satellite may perform paging on the UE, based on a result of transmitting, by a network entity, a paging request message to a second satellite communication cell corresponding to a ground location of the UE when the UE was last-connected to the first satellite communication cell, based on the first satellite communication cell and a relative movement of at least one satellite with respect to the ground. Here, when the satellite provides the second satellite communication cell, a BS may configure a paging message based on the paging request message received from the network entity, and the satellite may receive the paging message from the BS and thus may perform paging on the UE. However, when the satellite does not provide the second satellite communication cell but the first satellite provides the second satellite communication cell and the UE does not exist within coverage of the first satellite, the satellite may receive a paging relay message from the first satellite. However, when the satellite does not provide the second satellite communication cell but the first satellite provides the second satellite communication cell and the UE does not exist within coverage of the first satellite, the satellite may receive a paging relay message from the first satellite.

In operation 2730, the satellite may perform paging on the UE, based on the received paging message. In an embodiment, when the UE exists within coverage of the satellite, the satellite may perform paging on the UE. In another embodiment, when the UE does not exist within coverage of the satellite, the satellite may transmit a paging relay message to other satellite, may transmit a paging failure message to an entity of a core network, or may not transmit any message and may receive again a paging re-attempt request from the core network or the other satellite when a timer started by the satellite or the core network is expired.

The methods according to the embodiments of the present disclosure as described in claims or specification may be implemented as hardware, software, or a combination of hardware and software.

When implemented as software, a computer-readable storage medium or a computer program product which stores one or more programs (e.g., software modules) may be provided. The one or more programs stored in the computer-readable storage medium or the computer program product are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

In the afore-described embodiments of the present disclosure, components included in the present disclosure are expressed in a singular or plural form according to the embodiments of the present disclosure. However, the singular or plural form is appropriately selected for convenience of descriptions and the present disclosure is not limited thereto. As such, a component expressed in a plural form may also be configured as a single component, and a component expressed in a singular form may also be configured as plural components.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined to be implemented, when required. For example, portions of an embodiment of the present disclosure may be combined with portions of another embodiment of the present disclosure. Also, modifications based on the technical scope of the embodiments may be applied to other communication systems such as the LTE system, the 5G or NR system, or the like.

The invention claimed is:

1. A satellite communication cell management apparatus for managing satellite communication cells of at least one satellite, the satellite communication cell management apparatus comprising:

a transceiver; and at least one processor coupled with the transceiver and configured to:

determine a first satellite communication cell corresponding to a ground location of a user equipment (UE) based on information on a satellite communication cell being last-connected with the UE, transmit a first paging request message for the first satellite communication cell, wherein the first paging request message is associated with a paging message for the UE, and if paging associated with the first satellite communication cell fails, transmit a second paging request message for a second satellite communication cell, wherein the second satellite communication cell is included in a registration area (RA) including the first satellite communication cell, and wherein the at least one processor is further configured to:

connect a plurality of satellite communication cells in a management area of a base station (BS) center to a plurality of BSs managed by the BS center, and if the satellite communication cell exits from the management area of the BS center and the first satellite communication cell enters the management area of the BS center, according to a relative movement of at least one satellite with respect to a ground, release a connection between the satellite communication cell and a BS, among the BSs, and connect the first satellite communication cell to the BS.

2. The satellite communication cell management apparatus of claim 1, wherein some of the satellite communication cells constitute the RA, and the some of the satellite communication cells constituting the RA are disposed to be arranged in a band shape extending in a relative movement direction of at least one satellite with respect to the ground.

3. The satellite communication cell management apparatus of claim 1, wherein the at least one processor is configured to:

in case that paging of the second satellite communication cell fails, transmit a paging request message for a plurality of satellite communication cells including at least some of satellite communication cells within satellite coverage of satellites providing at least a part of the RA, or at least some of satellite communication cells within satellite coverages of a plurality of satellites.

4. The satellite communication cell management apparatus of claim 1, wherein the at least one processor is configured to:

in case that paging of the second satellite communication cell fails, attempt paging while gradually broadening a range of satellite communication cells until the paging succeeds.

5. The satellite communication cell management apparatus of claim 1, wherein the at least one processor is configured to:

receive a paging response message from the second satellite communication cell after the paging associated with the first satellite communication cell fails, wherein the paging response message is a message that is transmitted as a result of succeeding in paging to the UE based on a transmission of a paging relay message from a first satellite providing the first satellite communication cell to a second satellite providing the second satellite communication cell.

6. A user equipment (UE) in a satellite communication system, the UE comprising:

a transceiver; and at least one processor coupled with the transceiver and configured to:

if paging associated with a first satellite communication cell fails, receive a paging message associated with a second satellite communication cell included in a registration area (RA) including the first satellite communication cell, and based on the received paging message, perform a connection establishment procedure with the second satellite communication cell, wherein the first satellite communication cell corresponding to a ground location of the UE is determined based on information on a satellite communication cell being last-connected with the UE, wherein a plurality of satellite communication cells in a management area of a base station (BS) center are connected to a plurality of BSs managed by the BS center, wherein based on the satellite communication cell exiting from the management area of the BS center and the first satellite communication cell entering the management area of the BS center, according to a relative movement of at least one satellite with respect to a ground, a connection between the satellite communication cell and a BS, among the BSs is released, and the first satellite communication cell is connected to the BS.

7. The UE of claim 6, wherein the at least one processor is further configured to: receive a paging message from one of a plurality of satellite communication cells in case that the UE fails to receive the paging message associated with the second satellite communication cell, and wherein the plurality of satellite communication cells include satellite communication cells within satellite coverage of satellites providing at least a part of the RA, or satellite communication cells within satellite coverages of a plurality of satellites.

8. The UE of claim 6, wherein the second satellite communication cell is a satellite communication cell determined as a result of attempting a paging while gradually broadening a range of satellite communication cells until the paging succeeds in case that the UE fails to receive a paging message associated with the first satellite communication cell.

9. The UE of claim 6, wherein the second satellite communication cell is a satellite communication cell that performs a paging procedure on the UE when a paging relay message is transmitted from a first satellite providing the first satellite communication cell to a second satellite providing the second satellite communication cell as the UE fails to receive the paging message associated with the first satellite communication cell.

* * * * *